(12) United States Patent
Butler et al.

(10) Patent No.: US 10,320,576 B1
(45) Date of Patent: Jun. 11, 2019

(54) ENERGY MANAGEMENT SYSTEM

(71) Applicant: AMAZON TECHNOLOGIES, INC., Seattle, WA (US)

(72) Inventors: David George Butler, San Jose, CA (US); Richard William Mincher, Cupertino, CA (US); Arvind Thiagarajan, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1073 days.

(21) Appl. No.: 14/673,649

(22) Filed: Mar. 30, 2015

(51) Int. Cl.
  *G06F 1/04* (2006.01)
  *H04L 12/10* (2006.01)
  *G05B 15/02* (2006.01)

(52) U.S. Cl.
  CPC .............. *H04L 12/10* (2013.01); *G05B 15/02* (2013.01)

(58) Field of Classification Search
  CPC ...... G06F 1/3203; G06F 1/04; B60L 11/1838; H04B 17/00; H02J 9/00
  USPC .................. 713/300, 340; 700/286; 718/102
  See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 2002/0004912 A1* | 1/2002 | Fung ............... G06F 1/3203 713/300 |
| 2002/0120368 A1* | 8/2002 | Edelman ............ H02J 3/38 700/286 |
| 2004/0153676 A1* | 8/2004 | Krantz ............. G06F 1/3203 713/300 |
| 2006/0057967 A1* | 3/2006 | Shimada ........... G06F 1/3203 455/67.13 |
| 2008/0178032 A1* | 7/2008 | Walrath ............ G06F 1/3287 713/340 |
| 2010/0002610 A1* | 1/2010 | Bowser ............. G06F 1/3203 370/311 |
| 2011/0011936 A1 | 1/2011 | Morandi et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Michael Roswell
(74) *Attorney, Agent, or Firm* — Lindauer Law, PLLC

(57) ABSTRACT

Described are systems to manage energy distribution and operation of computing devices ("devices"). The devices may connect to a shared data and power distribution system, such as receiving electrical energy in conjunction with data signals using Power over Ethernet (POE). During activation of the facility, such as after an energy outage, the demand for energy from many devices attempting to startup may exceed the energy capacity available. Described are devices and techniques for distributing energy to devices, coordinating operating mode of the devices, and so forth, to mitigate demand spikes for electrical energy that exceed the capacity of the energy distribution system.

20 Claims, 13 Drawing Sheets

(56) References Cited

U.S. PATENT DOCUMENTS

| | | | |
|---|---|---|---|
| 2011/0204720 A1* | 8/2011 | Ruiz .................. | B60L 11/1816 |
| | | | 307/66 |
| 2011/0276194 A1* | 11/2011 | Emalfarb ............ | B60L 11/1838 |
| | | | 700/297 |
| 2012/0017216 A1* | 1/2012 | Chan ...................... | H04W 4/70 |
| | | | 718/102 |
| 2012/0200157 A1* | 8/2012 | Ohi .......................... | H02J 3/32 |
| | | | 307/23 |
| 2012/0284132 A1 | 11/2012 | Kim et al. | |
| 2012/0330470 A1* | 12/2012 | Hjelm .................... | G06Q 10/06 |
| | | | 700/286 |
| 2013/0164567 A1* | 6/2013 | Olsson ................ | H01M 10/488 |
| | | | 429/7 |
| 2013/0284806 A1 | 10/2013 | Margalit | |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

* cited by examiner

ENERGY MANAGEMENT SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to provide various functions such as acquiring data from sensors, processing information, and so forth, for operation of the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
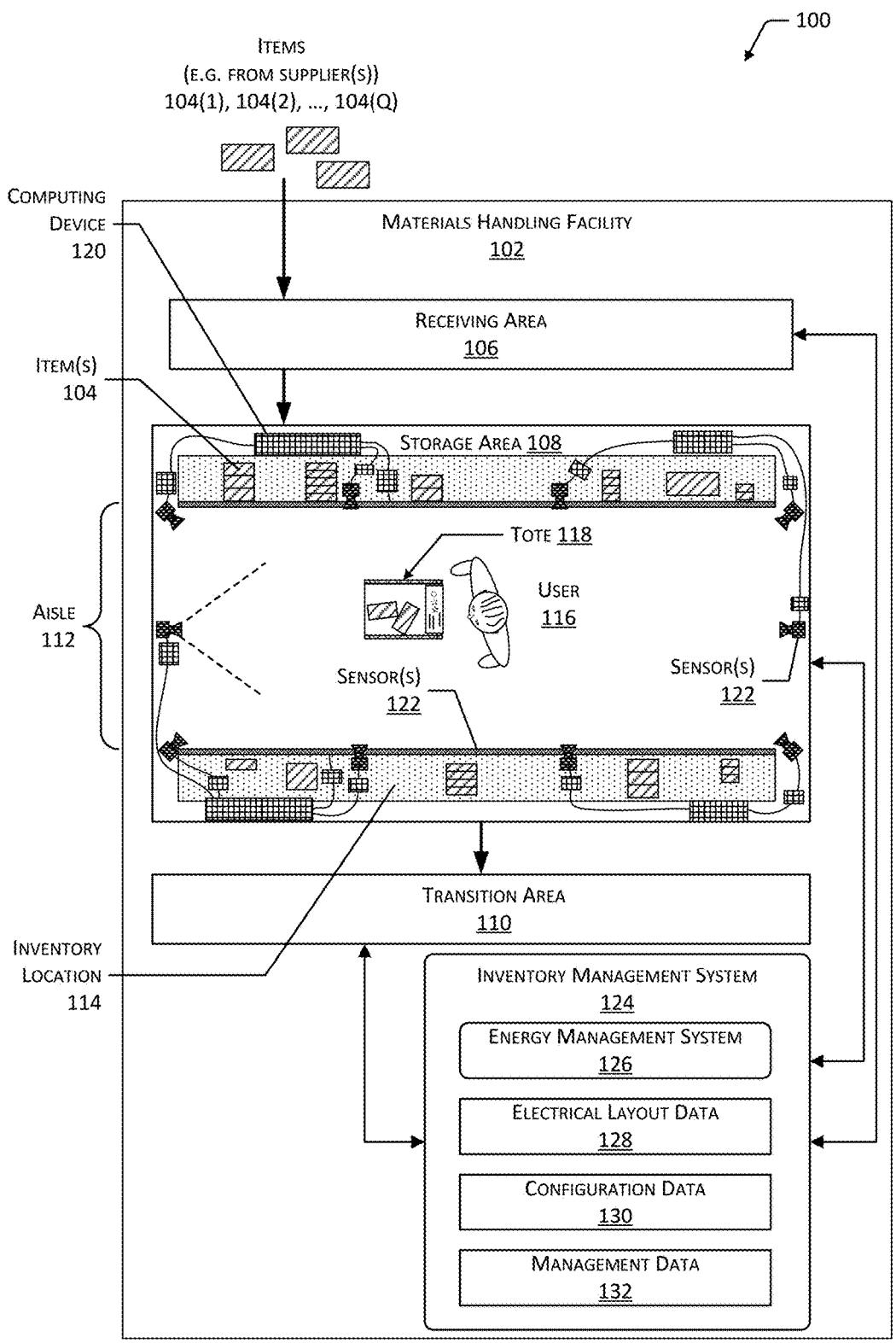
FIG. 1 is a block diagram illustrating a materials handling facility (facility) configured to use an energy management system.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for managing energy distribution within a facility. The facility may use one or more computing devices to provide various functions associated with operation of the facility. The computing devices may have various capabilities. For example, the computing device may be a sensor connected to a network to gather data. In another example, the computing device may be configured to perform data processing functions.

The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. The inventory management system, or another system, may generate this data based on data received from the computing devices. For example, images acquired from computing devices having cameras may be used to identify an object such as a user or item, track the object, and so forth. In some implementations, the inventory management system or the functions provided thereby may be distributed across one or more of the computing devices.

The computing devices may be located at different points within the facility. For example, those computing devices with cameras may be located to acquire image data suitable for particular uses. The image data may comprise still images or video. For example, cameras used to acquire images that are processed to identify a user may be configured with a field-of-view (FOV) that is likely to include the user's face. In another example, cameras used to acquire images that are processed to identify an item may be configured with a FOV that is likely to include the particular item or an inventory location stowing the item. In some implementations, the cameras may have different optical or electronic characteristics based at least in part on the intended usage.

The facility may implement any number of computing devices to support operation. For example, hundreds or thousands of computing devices with sensors may be located within the facility such as upon inventory locations to gather information about items as they are added or removed from inventory locations by users. In another example, computing devices may be coupled to sensors mounted overhead to provide information about the location and identity of users in the facility.

The computing device consumes electrical energy ("energy") to operate. Depending upon an operating mode of the computing device, the energy used by the computing device may vary. For example, the operating modes may include off, standby, charging, startup, or normal. While the computing device is in the "off" operating mode, no energy may be consumed. In comparison, during the "startup" operating mode, the demand for energy by the device may spike as the various components of the device are powered up.

The amount of energy that may be provided to the computing devices is ultimately constrained. For example, the main energy, such as electrical mains connecting an electrical generation utility to the facility, may have a maximum rate at which they can deliver energy.

An energy and data distribution device ("EDDD") may be used to communicatively couple the computing devices to a network for data communications and also to supply energy. The EDDD may obtain energy from another source, such as an electrical utility or from energy generation equipment within the facility.

Energy may be provided from the EDDD to the computing devices along with data connectivity using various techniques in which energy is delivered along one or more of the conductors present in the data network cabling. Due to the physical constraints such as size of the conductors in the data cabling, length of the cable runs, electrical resistance, electrical impedance, and so forth, energy delivery is constrained.

In one implementation, the EDDD may comprise an Ethernet switch with integrated Power Over Ethernet (POE) injectors. The computing device may then couple to a port on the EDDD by way of data cabling and establish network connection with other computing devices as well as receiving energy for operation.

The total energy that the EDDD is able to provide to a plurality of computing devices is constrained. For example, the energy supply of the EDDD has a maximum amount of energy that can be drawn from the mains. Similarly, the total energy that the EDDD is able to provide to a particular port and to the particular computing device coupled to that port is further constrained. For example, excessive energy draw across the data cabling may result in overheating of one or more of the conductors in the cabling.

At different times in operation, such as during the different operating modes described above, the energy consumed by the computing device may vary. For example, energy consumption of the computing device may peak during startup and then subside to an average level during normal operation.

The EDDD and associated electrical systems supplying the EDDD with energy may be able to readily handle the peak energy demands from a handful of computing devices. However, in the facility with hundreds or even thousands of computing devices, contemporaneous peak demand for many of these devices may exceed the capacity of the EDDD. For example, after an energy outage to the facility, the thousands of different computing devices will need to be restarted to restore the desired functionality.

Traditionally, energy management has been handled on a manual basis such as by having an operator manually close particular circuit breakers one at a time to attempt to prevent the resulting peak energy demand from overloading electrical mains. However, manual intervention may be infeasible as the complexity and size of the computing devices in the facility increases.

Failure to properly manage energy distribution may result in various problems. In one example, insufficient management may result in low-energy conditions such as voltage sags that prevent the computing devices from operating as designed. In another example, insufficient management may result in a failure cycle in which insufficient available energy results in the computing device beginning to start up but then generating an error condition and shutting down, only to partially restart again.

Described in this disclosure are devices and techniques to selectively control energy utilization by the computing devices within the facility. Selective control allows for the provisioning of energy to particular computing devices or groups thereof, such that the energy demands are controlled over time. As a result, the infrastructure of the facility is better able to provide energy without failure, is better able to recover from an energy outage, and the overall operation of the facility may be improved by maintaining the operation of the computing devices.

In the following implementations, control over the energy delivery rate may be provided by the computing device, by the EDDD, or a combination thereof. For example, the computing device may limit energy draw by controlling the operation thereof. In another example, the EDDD may limit energy draw by controlling the energy distributed to the computing device, such as by current limiting, voltage limiting, and so forth.

In a first implementation, the computing device may have an energy storage device capable of storing energy. For example, the computing device may include one or more capacitors, batteries, and so forth. The computing device may have timeslot designation data that indicates a particular interval of time at which that device may obtain energy. The timeslot designation data may be generated onboard the computing device, may be provided by another device such as a server, and so forth.

During the interval specified by the timeslot, the computing device may obtain energy and charge the energy storage device. The energy delivery rate may be limited, such as to a maximum value. At times other than the designated timeslot, the computing device does not draw energy, or the energy draw may be reduced to a lower level.

After the energy storage device of the computing device has been charged to a predetermined level, the computing device may utilize that stored energy to perform one or more functions, such as entering a startup mode. By drawing the energy from the energy storage device rather than from the EDDD, the peak demand for energy is reduced or eliminated.

As with the first implementation, a second implementation may utilize computing devices having an energy storage device. In the second implementation, an energy delivery rate is limited across a plurality of computing devices. For example, the total available energy output of the EDDD may be divided by the number of computing devices connected to the ports, and the resulting value may be used to set the limit of maximum energy transfer. The plurality of computing devices may then charge their onboard energy storage devices contemporaneously. Once the energy storage devices have been charged to a predetermined level, the limit on the energy delivery rate may be rescinded. For example, a server may send to the computing devices an energy delivery authorization that rescinds the limit, the EDDD may cease current limiting the ports, and so forth. As described above, the computing device may then utilize the stored energy to perform one or more functions and thus reduce or eliminate the peak demand for energy.

In a third implementation, energy is distributed based on timeslots. The computing device may have timeslot designation data that indicates a particular timeslot at which that computing device may obtain energy. The timeslot designation data may be generated onboard the computing device, may be provided by another device such as a server, and so forth.

During the interval specified by the timeslot, the computing device may obtain energy. The energy delivery rate may be limited, such as to maximum value. At times other than the designated timeslot, the computing device does not draw energy, or the energy draw may be reduced to a lower level. In one implementation, the energy obtained may be controlled by the computing device. For example, the computing device may include an energy management processor having an onboard clock. The energy management processor may determine when current time, as output by the clock, corresponds to the timeslot designated by the timeslot designation data. The current time may or may not indicate elapsed time with respect to a particular epoch. When the clock indicates the current time corresponds to the timeslot designation data, one or more functions of the computing device may be selectively activated to control energy consumption. In another implementation where the delivery of energy is controlled by the EDDD, the timeslot may be used to determine when energy is provided to a particular port. In some implementations, the energy management processor may comprise an energy management integrated circuit ("PMIC") with a real-time clock ("RTC"). The RTC may be configured to generate current time data that is indicative of an elapsed time relative to an epoch. In some implementations time sync data may be used to synchronize the RTC with an external time source.

By using the techniques described in this disclosure, overall operation of the facility may be improved, costs may be reduced, and so forth. The energy management described may reduce or eliminate the need for manual intervention by an operator, improve overall system availability, reduce cost of the infrastructure to provide energy within the facility, and so forth. For example, by reducing the amplitude or duration of a peak load, less stringent engineering requirements may result. This may, in turn, reduce the cost of the systems necessary to implement those requirements.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with an energy source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), 118, . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth. The totes 118 are discussed in more detail below with regard to FIG. 6.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more computing devices 120 may be located within the facility 102. The computing device 120 may be configured to acquire data from one or more sensors 122, process data from the one or more sensors 122, or perform other functions. The computing devices 120 may couple to a network to provide data communication with other devices such as other computing devices 120, and so forth. Electrical energy ("energy") may be provided to the computing devices 120 or the one or more sensors 122 coupled thereto by way of the network. For example, energy may be distributed using one or more conductors in network cabling. The computing devices 120 are described below in more detail with regard to FIG. 4.

The one or more sensors 122 may be configured to acquire information in the facility 102. The sensors 122 may include, but are not limited to, imaging sensors, weight sensors, proximity sensors, radio frequency (RF) receivers, microphones, temperature sensors, humidity sensors, vibration sensors, and so forth. The sensors 122 may be stationary or mobile, relative to the facility 102. For example, in addition to the computing devices 120, the inventory locations 114, the totes 118, or other devices such as user devices may contain sensors 122 configured to acquire sensor data. The sensors 122 are discussed in more detail below with regard to FIG. 2.

While the storage area 108 is depicted as having one or more aisles 112, inventory locations 114 storing the items 104, sensors 122, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 124. The inventory management system 124 is configured to interact with users 116 or devices such as computing devices 120, sensors 122, robots, material handling equipment, and so forth, in one or more of the receiving area 106, the storage area 108, the transition area 110, or other areas of the facility 102.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 124 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108 and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 124.

In another example, if the items 104 are departing the facility 102, a list of the items 104 may be obtained and used by the inventory management system 124 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 124 may include an energy management system 126. The energy management system 126 may be configured to coordinate energy resources within the facility 102. This coordination may include affecting operation of one or more devices such as energy and data distribution devices (EDDDs), the computing devices 120, and so forth.

During operation, the energy management system 126 may utilize electrical layout data 128, configuration data 130, and management data 132. The electrical layout data 128 provides information associated with the electrical distribution infrastructure of the facility 102. For example, the electrical layout data 128 may comprise a wiring diagram or equivalent information indicative of circuit breakers, circuit branches, what circuit a particular EDDD is drawing energy from, and so forth. The electrical layout data 128 may also comprise information indicative of energy transfer limits such as maximum amperage levels. In some implementations, the electrical layout data 128 may include information about the energy requirements of a particular computing device 120.

The configuration data 130 may comprise information such as computing devices 120 that are designated as priority for startup, limits, tolerances, or threshold values for operation, and so forth. For example, the configuration data 130 may specify computing devices 120 that provide image data from attached image sensors 122 have a higher priority for the allocation of energy than the computing devices 120 that provide weight data from attached weight sensors 122. In another example, the configuration data 130 may specify that the energy management system 126 is to limit maximum energy transfer to a computing device 120 to 95% of the maximum that a given circuit is rated at.

The management data 132 comprises information associated with management of the energy in the facility 102. For example, the management data 132 may include energy availability data, energy use data, energy request data, energy delivery authorization data, timeslot designation data, and so forth. The management data 132 is described in more detail below with regard to FIG. 3.

During operation, the energy management system 126 may use the data described above to coordinate energy distribution. For example, the energy management system 126 may receive information that the facility 102 has entered a lower energy mode. In this example, an electrical utility may provide information to the facility 102 (such as from a "smart meter", data connection, or other mechanism) indicating that demand for electricity is to be reduced. Responsive to this, the energy management system 126 may begin placing one or more of the computing devices 120 into an operating mode that consumes less energy. The particular computing devices 120 that are placed into a given operating mode, such as turned off or placed in the standby mode, may be determined by the priority specified in the configuration data 130. In another example, after an energy outage, the energy management system 126 may begin to selectively reactivate the computing devices 120 using the techniques described below. The selective reactivation may be used to mitigate or eliminate the situation where a plurality of computing devices 120 contemporaneously demand energy in excess of that which the energy distribution infrastructure is able to supply. The energy management system 126 may also be used to control average energy consumption of the facility 102, or other aspects of energy consumption.

In some implementations, the energy management system 126 may operate in conjunction with a heating ventilation and air conditioning ("HVAC") system to control environmental conditions within the facility 102. For example, during the summer when temperatures in the facility 102 may be elevated, the HVAC system may communicate with the energy management system 126 such that the energy management system 126 reduces energy consumption within the facility 102. For example, the HVAC and the energy management system 126 may be connected to a data network. By reducing overall energy, the amount of energy dissipated as heat may be reduced, and thus reducing the temperature in the facility 102.

Figure 2:
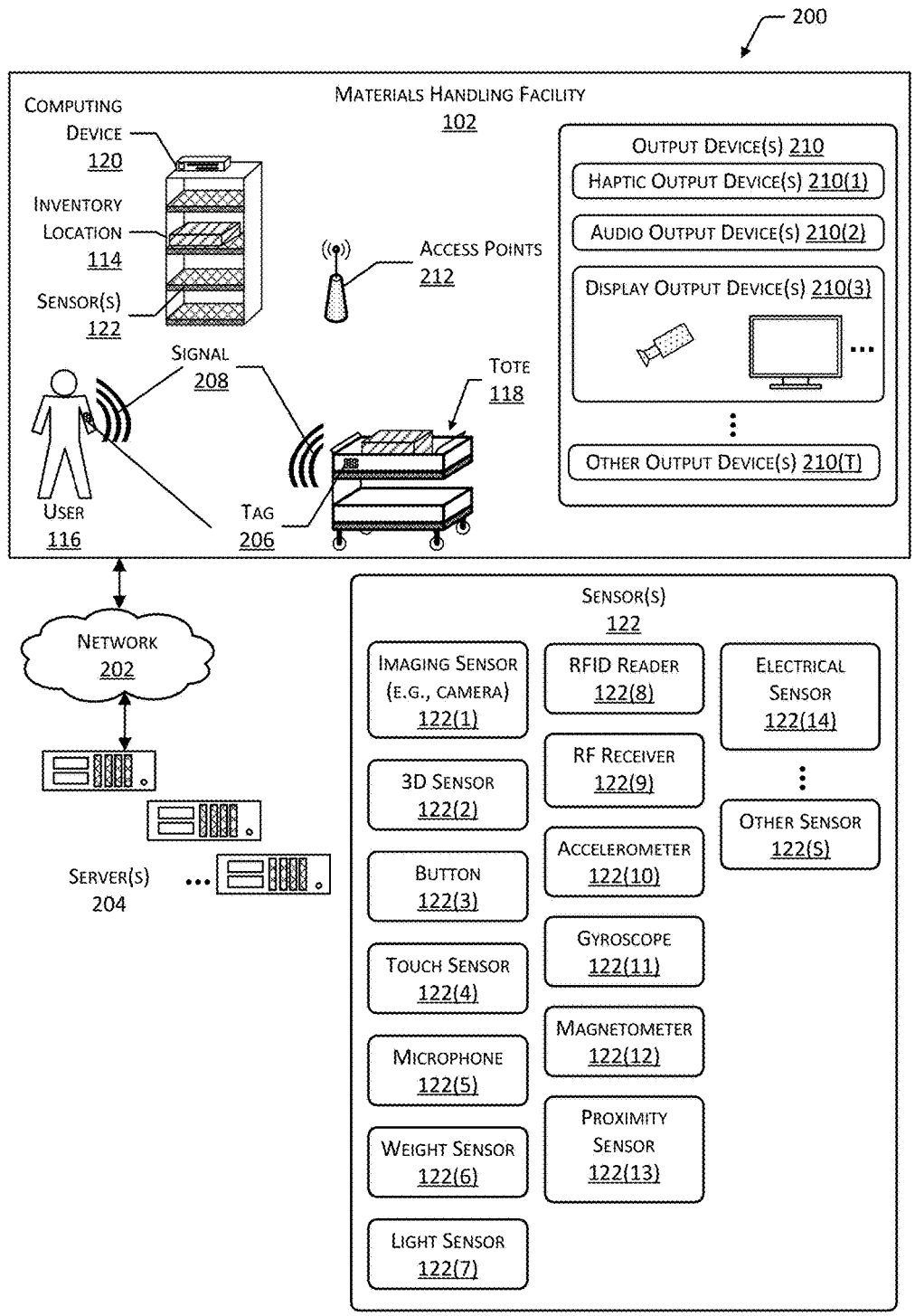
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may also be configured to provide energy to devices such as the computing devices 120. For example, the network 202 may comprise wired Ethernet. The wires in the Ethernet cabling may be used to transfer data signals as well as energy to provide for the operation of the computing devices 120. The same wire may be used to deliver energy and data, or different wires may be used. For example, some wires may be used to deliver data signals while other wires may be used to transfer energy. In implementations where different wires are used to deliver energy and data, the wires may be bundled or packaged together into a common cable.

The servers 204 may be configured to execute one or more modules or software applications associated with the inventory management system 124. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and an energy source configured to provide energy to the transmitter. For example, the tag 206 may comprise a Bluetooth Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 124 may be configured to use the tags 206 for one or more of identification of the object, determining a location of the object, and so forth. For example, the users 116 may wear tags 206, the totes 118 may have tags 206 affixed, and so forth, that may be read and used to determine identity and location.

Generally, the inventory management system 124 or other systems associated with the facility 102 may include any number and combination of input components, output components, and servers 204.

The one or more sensors 122 may be arranged at one or more locations within the facility 102. For example, the sensors 122 may be mounted on or within a floor, wall, or ceiling, at an inventory location 114, on the tote(s) 118, may be carried or worn by the user(s) 116, and so forth. In some implementations, the sensors 122 may be coupled to a computing device 120. In other implementations, the sensors 122 may be integrated with a computing device 120.

The sensors 122 may include one or more imaging sensors 122(1). These imaging sensors 122(1) may include cameras configured to acquire images of a scene. The imaging sensors 122(1) are configured to detect light in one or more wavelengths including, but not limited to, terahertz, infrared, visible, ultraviolet, and so forth. The inventory management system 124 may use image data acquired by the imaging sensors 122(1) during operation of the facility 102. For example, the inventory management system 124 may identify items 104, users 116, totes 118, and so forth, based at least in part on their appearance within the image data.

One or more 3D sensors 122(2) may also be included in the sensors 122. The 3D sensors 122(2) are configured to acquire spatial or three-dimensional data, such as depth information, about objects within a sensor FOV. The 3D sensors 122(2) may include range cameras, lidar systems, sonar systems, radar systems, structured light systems, stereo vision systems, optical interferometry systems, coded aperture systems, and so forth.

The inventory management system 124 may use the three-dimensional data acquired to identify objects or determine one or more of a location, orientation, or position of an object. For example, facility data may include one or more of a location, orientation, position, or pose of the user 116 in three-dimensional space within the facility 102. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 122(3) may be configured to accept input from the user 116. The buttons 122(3) may comprise mechanical, capacitive, optical, or other mechanisms. For example, the buttons 122(3) may comprise mechanical switches configured to accept an applied force from a touch of the user 116 to generate an input signal. The inventory management system 124 may use data from the buttons 122(3) to receive information from the user 116. For example, the buttons 122(3) may be used to accept input from a user 116 such as a username and password associated with an account.

The sensors 122 may include one or more touch sensors 122(4). The touch sensors 122(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 124 may use data from the touch sensors 122(4) to receive information from the user 116. For example, the touch sensor 122(4) may be integrated with the tote 118 to provide a touchscreen with which the user 116 may select from a menu one or more particular items 104 for picking.

One or more microphones 122(5) may be configured to acquire audio data indicative of sound present in the environment. The sound may include user speech uttered by the user 116. In some implementations, arrays of microphones 122(5) may be used. These arrays may implement beamforming or other techniques to provide for directionality of gain. The inventory management system 124 may use the one or more microphones 122(5) to accept voice input from the users 116, determine the location of one or more users 116 in the facility 102, and so forth.

One or more weight sensors 122(6) may be configured to measure the weight of a load, such as the item 104, the user 116, the tote 118, and so forth. The weight sensors 122(6) may be configured to measure the weight of the load at one or more of the inventory locations 114, the tote 118, or on the floor of the facility 102. The weight sensors 122(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 124 may use the data acquired by the weight sensors 122(6) to identify an object, determine a location of an object, maintain shipping records, and so forth. For example, the weight sensors 122(6) at a particular location in the facility 102 may report a weight of the user 116, indicating the user 116 is present at that location.

The sensors 122 may include one or more light sensors 122(7). The light sensors 122(7) may be configured to provide information associated with ambient lighting conditions such as a level of illumination. Information acquired by the light sensors 122(7) may be used by the inventory management system 124 to adjust a level, intensity, or configuration of the output device 210.

One or more radio frequency identification (RFID) readers 122(8), near field communication (NFC) systems, and so forth, may also be provided as sensors 122. For example, the RFID readers 122(8) may be configured to read the RF tags 206. Information acquired by the RFID reader 122(8) may be used by the inventory management system 124 to identify an object associated with the RF tag 206 such as the item 104, the user 116, the tote 118, and so forth.

One or more RF receivers 122(9) may also be provided. In some implementations, the RF receivers 122(9) may be part of transceiver assemblies. The RF receivers 122(9) may be configured to acquire RF signals 208 associated with Wi-Fi Bluetooth, ZigBee, 3G, 4G, LTE, or other wireless data transmission technologies. The RF receivers 122(9) may provide information associated with data transmitted via radio frequencies, signal strength of RF signals 208, and so forth. For example, information from the RF receivers 122(9) may be used by the inventory management system 124 to determine a location of an RF source such as a device carried by the user 116.

The sensors 122 may include one or more accelerometers 122(10), which may be worn or carried by the user 116, mounted to the tote 118, and so forth. The accelerometers 122(10) may provide information such as the direction and magnitude of an imposed acceleration. Data such as rate of acceleration, determination of changes in direction, speed, and so forth, may be determined using the accelerometers 122(10).

A gyroscope 122(11) may provide information indicative of rotation of an object affixed thereto. For example, the tote 118 or other objects or devices may be equipped with a gyroscope 122(11) to provide data indicative of a change in orientation.

A magnetometer 122(12) may be used to determine a heading by measuring ambient magnetic fields, such as the terrestrial magnetic field. The magnetometer 122(12) may be worn or carried by the user 116, mounted to the tote 118, and so forth. For example, the magnetometer 122(12) as worn by the user 116(1) may act as a compass and provide information indicative of which way the user 116(1) is facing.

A proximity sensor 122(13) may be used to determine presence of an object, such as the user 116, the tote 118, and so forth. The proximity sensors 122(13) may use optical, electrical, ultrasonic, electromagnetic, or other techniques to determine a presence of an object. In some implementations, the proximity sensors 122(13) may use an optical emitter and an optical detector to determine proximity. For example, an optical emitter may emit light, a portion of which may then be reflected by the object back to the optical detector to provide an indication that the object is proximate to the proximity sensor 122(13). In other implementations, the proximity sensors 122(13) may comprise a capacitive proximity sensor 122(13) configured to provide an electrical field and determine a change in electrical capacitance due to presence or absence of an object within the electrical field.

The proximity sensors 122(13) may be configured to provide sensor data indicative of one or more of a presence or absence of an object, a distance to the object, or characteristics of the object. An optical proximity sensor 122(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 122(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 122(13) may be installed at the inventory location 114.

Electrical sensors 122(14) may also be provided. The electrical sensors 122(14) may be configured to measure one or more of energy transfer, amperage, voltage, frequency, waveform, phase, apparent instantaneous energy, actual energy, energy factor, energy over a period of time (such as watt-hours), and so forth. For example, the electrical sensor 122(14) may comprise a watt meter. The electrical sensors 122(14) may be coupled to an energy distribution system such that information about the energy may be obtained. For example, the electrical sensors 122(14) may be coupled to or utilized in a power supply of the computing device 120, the port of the EDDD, and so forth.

The sensors 122 may include other sensors 122(S) as well. For example, the other sensors 122(S) may include ultrasonic rangefinders, thermometers, barometric sensors, hygrometers, or biometric input devices including, but not limited to, fingerprint readers or palm scanners.

The output devices 210 may also be provided in the facility 102. The output devices 210 may be configured to generate signals that may be perceived by the user 116. The output devices 210 may be coupled to or incorporated with one or more of the computing devices 120.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 122(1) or light sensor 122(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

The display output devices 210(3) may be configurable to provide image or non-image output. For example, an electrophoretic display output device 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 124, the sensors 122, the tags 206, a communication device of the tote 118, or other devices. In other implementations, a wired networking infrastructure may be implemented. For example, cabling may be used to provide Ethernet local area network connectivity at the facility, such as between servers 204, access points 212, computing devices 120, and so forth.

Figure 3:
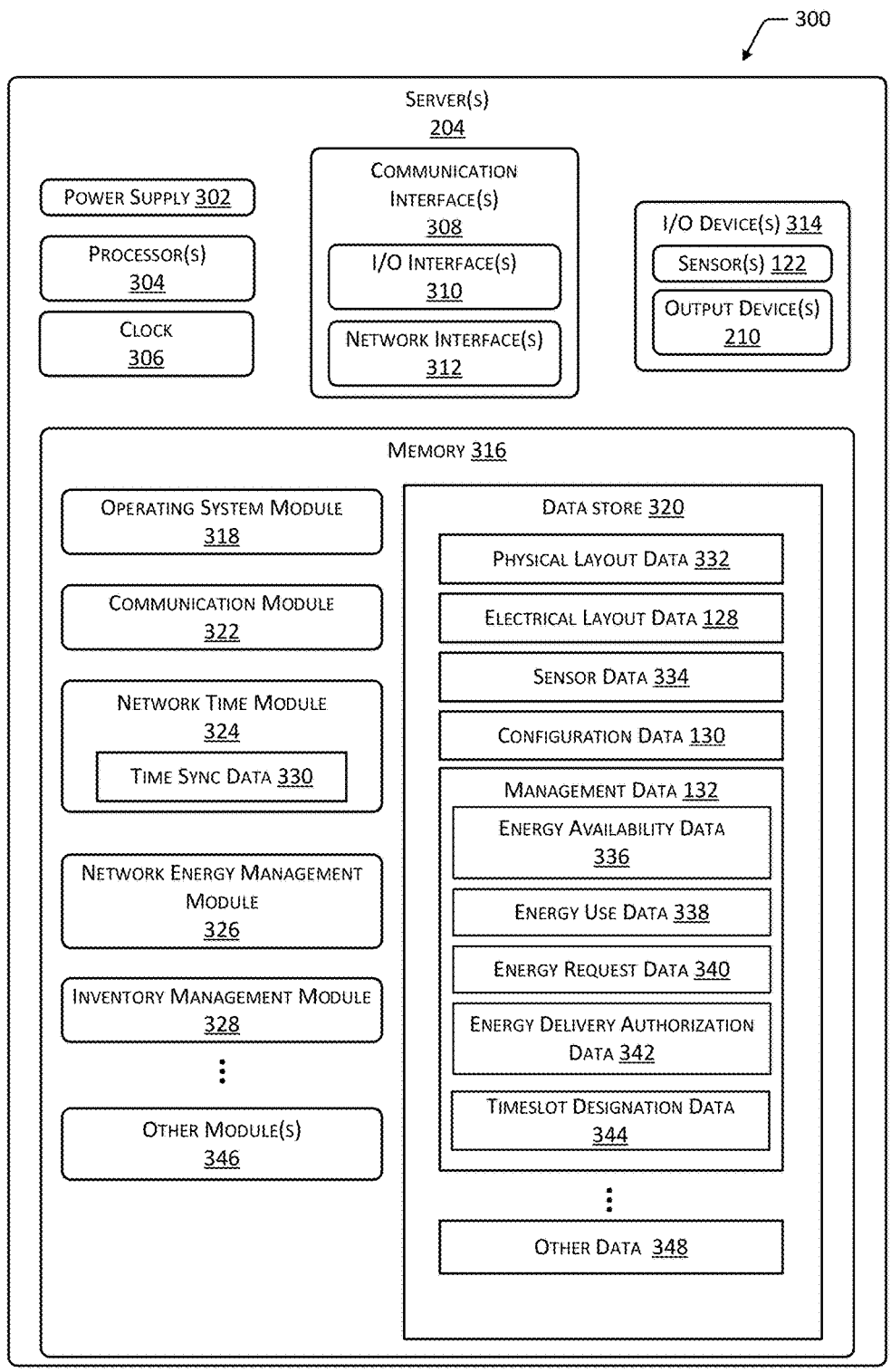
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing"", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical energy suitable for operating the components in the server 204. The server 204 may include one or more hardware processors 304 (processors) configured to execute one or more stored instructions. The processors 304 may comprise one or more cores. The cores may be of one or more types. For example, the processors 304 may include application processor units, graphic processing units, and so forth. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 122, keyboard, mouse, scanner, and so forth. The I/O devices 314 may also include output devices 210 such as one or more of a display output device 210(3), printer, audio speakers, and so forth. In some embodiments, the I/O devices 314 may be physically incorporated with the server 204 or may be externally placed.

The network interfaces 312 are configured to provide communications between the server 204, the computing devices 120, the totes 118, routers, access points 212, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The modules may include, but are not limited to, the following: a communication module 322, a network time module 324, a network energy management module 326, or an inventory management module 328.

The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

The communication module 322 may be configured to establish communications with one or more of the computing devices 120, totes 118, other servers 204, or other devices. The communications may be authenticated, encrypted, and so forth.

The network time module 324 may be configured to generate time sync data 330. The time sync data 330 is configured to synchronize the time as measured by real-time clocks on one or more devices on the network 202. For example, the computing devices 120 may receive time sync data 330 and adjust their onboard clocks accordingly to maintain synchronization. The network time module 324 may implement one or more time management protocols. For example, the network time module 324 may include the Network Time Protocol (NTP) (such as NTP version 4), Simple Network Time Protocol (SNTP), Windows Time Service as promulgated by Microsoft Corporation, and so forth.

The network energy management module 326 is configured to provide energy management functions to the facility 102 and one or more of the devices therein. The network energy management module 326 may be in communication with one or more of the computing devices 120 using the network 202. During operation, the network energy management module 326 may use one or more of physical layout data 332, sensor data 334, the electrical layout data 128, the configuration data 130, the management data 132, and so forth.

The physical layout data 332 comprises information about the physical configuration of the facility 102 or portions thereof. For example, the physical layout data 332 may include electronic representations of the physical structures in the facility 102, such as computer aided design (CAD)

data of the aisle 112 configurations, inventory locations 114, information about which items 104 are in what inventory locations 114, real coordinates of the computing devices 120, and so forth. The physical layout data 332 may include information about the presence of walls, HVAC equipment, location of doors and windows, and so forth.

In some implementations, the network energy management module 326 may use the physical layout data 332 to generate data indicative of a priority to provide energy to particular computing devices 120 at particular locations within the facility 102. For example, a sparse subset of the computing devices 120 that obtain sensor data 334 from sensors 122 may be assigned priority based on their location within the facility 102, such as every 5 feet. During a situation in which energy delivery is restricted, such as during a restart of the facility 102, the network energy management module 326 may give priority to those computing devices 120 within the subset such that partial capabilities of the facility 120 come online more quickly. As more energy becomes available or energy resources are otherwise freed up, the remaining computing devices 120 may be allocated energy.

As described above, the electrical layout data 128 provides information associated with the electrical distribution infrastructure of the facility 102. For example, the electrical layout data 128 may comprise a wiring diagram or equivalent information indicative of circuit breakers, circuit branches, what circuit a particular EDDD is drawing energy from, and so forth. The electrical layout data 128 may include information such as maximum energy capacities of particular circuits or energy handling devices, voltages available from particular equipment, and so forth.

During operation, the network energy management module 326 may use the electrical layout data 128 to determine how energy is to be distributed. For example, the network energy management module 326 may be configured to activate and provide energy to computing devices 120 from no more than three EDDDS per branch circuit, to avoid overloading the current capacity of the branch circuit.

In some implementations, the electrical layout data 128 may include information about the energy requirements of particular computing devices 120. For example, characteristics such as energy demands of a particular computing device 120 or make and model of a computing device 120 while operating in different operating modes may be stored.

The sensor data 334 may comprise information acquired from, or based on, the one or more sensors 122. For example, the sensor data 334 may comprise image data acquired from the imaging sensors 122(1), 3D information about an object in the facility 102 as acquired by the 3D sensors 122(2), weight data as acquired by the weight sensors 122(6), energy use data as obtained from the electrical sensors 122(14), and so forth.

The network energy management module 326 may be configured to use the sensor data 334 during operation. For example, sensor data 334 may be used to prioritize the distribution of energy to the computing devices 120 servicing portions of the facility 102 that are occupied by users 116 and deprioritize the distribution of energy to the computing devices 120 in the unoccupied locations.

As described above, the configuration data 130 may comprise information such as computing devices 120 that are designated as priority for startup, limits, tolerances, threshold values for operation, and so forth. For example, priority levels may be assigned to particular computing devices 120 or classes of computing devices 120. In another example, the configuration data 130 may specify limits for energy transfer, minimum amounts of time to transfer energy for, maximum amount of time to transfer energy for, and so forth.

The network energy management module 326 may also use the configuration data 130 during operation. For example, the energy management module 326 may access information about the energy delivery capabilities of a particular EDDD and of the computing devices 120 attached thereto to control energy distribution such that the particular EDDD is not overloaded by multiple energy demand peaks from the computing devices 120.

The management data 132 comprises information associated with management of the energy in the facility 102. The management data 132 may include one or more of energy availability data 336, energy use data 338, energy request data 340, energy delivery authorization data 342, timeslot designation data 344, and so forth.

The energy availability data 336 provides information indicative of one or more of quantity or nature of energy available at a particular time. For example, the energy availability data 336 may indicate available energy at a previous time based on historical data, energy available at this instant in time, or may comprise a prediction or estimate of energy available at another time. Energy availability data 336 thus provides an indication of how much energy may be drawn at a given point in time. The energy availability data 336 may be provided by a device that stores or transfers energy. For example, the EDDD may generate energy availability data 336 indicating how much energy is available to be provided per port to connected computing devices 120. In another example, the computing device 120 may provide energy availability data 336 indicative of the amount of energy stored in an onboard energy storage device.

The network energy management module 326 may use the energy availability data 336 to determine how to allocate energy within the facility 102. For example, if energy availability data 336 indicates that the facility 102 is operating at low energy conditions such as during a utility initiated brownout, the network energy management module 326 may discontinue providing energy to designated devices. Continuing the example above, based on the energy availability data 336 as provided by the EDDD, the network energy management module 326 may determine a particular rate in which to deliver energy to particular computing devices 120 connected to the EDDD.

The energy use data 338 provides information about consumption of energy. The energy use data 338 may indicate consumption as a unit of time, as an instantaneous value, and so forth. For example, the computing device 120 may generate energy use data 338 indicating that it has used 35 Watt-hours of energy. The energy use data 338 may provide information about peak energy usage. For example, energy use data 338 may indicate an amplitude of the peak energy usage, a duration of the peak energy usage, and so forth. In some implementations, energy use data 338 may include additional information such as a type of task to be completed, estimated duration of the energy usage, and so forth.

The network energy management module 326 may access energy use data 338 to determine current usage of energy within the facility 102 or portion thereof. Based at least in part on the energy use data 338, the network energy management module 326 may change allocation of energy to one or more computing devices 120 or other devices.

The energy request data 340 comprises information that may be sent from an energy consuming device to the network energy management module 326, an energy producing device, or an energy distributing device such as the EDDD. For example, the computing device 120 may have in a processing queue a task that is computationally intensive and requires operating the application hardware processor at a higher clock speed that consumes more energy. The computing device 120 may provide energy request data 340 to the network energy management module 326. Should the energy be available, or other criteria be met, the network energy management module 326 may generate the energy delivery authorization data 342 that is provided to the EDDD to handle distribution of the energy.

The energy delivery authorization data 342 provides an indication that a particular computing device 120 or group of computing devices 120 is authorized to obtain energy. The energy delivery authorization data 342 may specify a duration, quantity, or other aspect of the associated energy delivery. For example, responsive to the request for energy described in the paragraph above, the network energy management module 326 may respond to the energy request data 340 generated by the computing device 120 with energy delivery authorization data 342. With the energy delivery authorization data 342 thus obtained, the computing device 120 may obtain the additional energy and perform the task that is queued for processing.

In one implementation, the energy delivery authorization data 342 may authorize the piece of energy consuming equipment such as the computing device 120 to draw more energy. The energy consuming equipment, such as the computing device 102, manages its draw on the energy distribution infrastructure to the level of energy draw indicated by the energy delivery authorization data 342.

In another implementation, the energy delivery authorization data 342 may instruct a piece of energy generating or distributing equipment, such as the EDDD, to control the energy provided to an attached piece of energy consuming equipment such as the computing device 120. For example, the energy delivery authorization data 342 may instruct the EDDD to set a higher limit on the electrical current that may be drawn for a particular port to which the particular computing device 120 is coupled.

In yet another implementation, a combination of the techniques described above may be used. For example, the computing device 120 may control its demand for energy while the EDDD limits the maximum amount of energy that may be delivered.

In some implementations, the network energy management module 326 may manage distribution of energy based on a comparison between current time and data indicative of a timeslot. For example, a first group of computing devices 120 may be assigned a first timeslot and a second group of computing devices 120 may be assigned a second timeslot. The timeslot may be a periodically recurring interval. For example, the first timeslot may comprise even-numbered tenths of a second, while a second timeslot may comprise odd-numbered tenths of a second. During the time indicated by a clock, such as a real-time clock ("RTC") synchronized by the network time module 324 using the time sync data 330, energy may be provided to those respective computing devices 120. For example, at the timeslot beginning at time 11:31:27.2 (hours:minutes:seconds), the first group of computing devices 120 may be able to obtain energy from another device, such as the EDDD or an upstream computing device 120. Continuing the example, at the timeslot beginning at time 11:31:27.3, the second group of computing devices 120 may be able to obtain energy.

The periodicity and duration of the timeslot may be selected to suit the needs of the facility 102 or other factors. For example, timeslots may have a period of one second, one minute, one hour, one day, and so forth. Similarly, the duration or length of the timeslot may range from nanoseconds to years. In one implementation, the period of the timeslot may be between one and 10 seconds, while the duration of the timeslot is between 1 and 10,000 milliseconds (ms). In some implementations, a given computing device 120 may be assigned timeslot designation data 344 that indicates multiple timeslots within which energy may be obtained. For example, a high priority computing device 120 may be permitted to obtain electrical energy during two timeslot intervals.

The timeslot designation data 344 comprises information indicative of a particular timeslot. The timeslot designation data 344 may be assigned by the network energy management module 326 and distributed to the computing devices 120. In some implementations, the timeslot assigned to a particular computing device 120 may be based at least in part on one or more of a location of at least a portion of the computing device 120 within the facility 102, a location of the computing device 120 relative to another computing device 120, a priority level associated with the computing device 120, an identifier associated with at least a portion of the computing device 120, and so forth. For example, computing devices 120 providing functions in high value locations of the facility 102 may be given earlier and more frequent timeslots as compared to those computing devices 120 located in infrequently used areas of the facility 102. In another example, the timeslot may be determined using an identifier associated with at least a portion of the computing device 120, such as a media access control (MAC) address or network address of a network interface, a processor serial number, and so forth.

In other implementations, the timeslot may be assigned to a particular computing device 120 in a random or pseudo-random fashion. For example, a pseudorandom number generator ("PRNG") function may be used to generate timeslot designation data 344 for one or more computing devices 120.

In another implementation, the computing device 120 may determine its timeslot designation data 344 independently. For example, the computing device 120 may use an onboard PRNG or the identifier associated with at least a portion of the computing device 120 to determine timeslot designation data 344.

In yet another implementation, the timeslot designation data 344 may comprise data indicative of one or more of a start or end of a timeslot to transfer energy. For example, the timeslot designation data 344 may comprise data sent along the network that indicates the start of one timeslot, beginning of another, and so forth.

The network energy management module 326 may use the data as described above to allocate the distribution of energy within the facility 102. For example, based on the physical layout data 332, the electrical layout data 128, and the configuration data 130, the network energy management module 326 may assign particular timeslot designation data 344 to computing devices 120 in the facility 102. The network energy management module 326 may then distribute energy to the respective computing devices 120 during their respective timeslots.

Additional details about how the network energy management module 326 may distribute energy are described below with regard to FIGS. 7-13.

The inventory management module 328 may be configured to provide the inventory functions as described herein with regard to the inventory management system 124. For example, the inventory management module 328 may track items 104 between different inventory locations 114, to and from the totes 118, and so forth.

The inventory management module 328 may be configured to acquire and access information associated with operation of the facility 102. For example, the inventory management module 328 may access the sensor data 334 obtained from one or more of the sensors 122 coupled to the computing devices 120. The inventory management module 328 may be configured to track objects in the facility 102 using the physical layout data 332, sensor data 334, and so forth, which may be stored in the data store 320.

The inventory management module 328 may perform one or more image processing functions to facilitate operation of the facility 102. For example, the functions may include identifying an object depicted in the image data, determining a position of the object in the image data, determining motion of objects in an image, and so forth. The objects may include, but are not limited to the items 104, users 116, totes 118, and so forth.

The image processing functions described in this disclosure may be performed at least in part using one or more of the following tools or techniques. In one implementation, the facial recognition or other image processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the images. In another implementation, the EyeFace SDK as promulgated by Eyedea Recognition Ltd. of Prague, Czech Republic, may be used to process the image data. The OpenBR library and tools as originated by MITRE Corporation of Bedford, Mass., USA, and McLean, Virginia, USA, and promulgated by the OpenBR group at openbiometrics.org may also be used in some implementation for image processing.

In some implementations, the inventory management module 328 may perform facial recognition. Facial recognition may include analyzing facial characteristics that are indicative of one or more facial features in an image, three-dimensional data, or both. For example, the face of the user 116 may be detected within one or more of the images. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors as descriptive of a human face may be known as "eigenfaces" or "eigenimages".

The identification process may include comparing the eigenvectors of the image with those previously stored as facial characteristics to determine identity of the user 116. For example, the face of the user 116 may be identified using the "FaceRecognizer" class of the OpenCV library. The results may then be stored as the identification data in the data store 320.

In other implementations, other techniques may be used to recognize faces. Previously stored data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the identity of the user 116 in the image or to distinguish one user 116 from another.

Clothing recognition analyzes images to determine what articles of clothing, ornamentation, and so forth, the user 116 is wearing or carrying in the facility 102. Skin and hair detection algorithms may be used to classify portions of the image that are associated with the user's 116 skin or hair. Items that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

Gait recognition techniques analyze one or more of images, three-dimensional data, or other data, to assess how a user 116 moves over time. Gait comprises a recognizable pattern of movement of the user's 116 body that is affected by height, age, and other factors. Gait recognition may analyze the relative position and motion of limbs of the user 116. Limbs may include one or more arms, legs, and in some implementations, the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity may be based on a combination of these or other recognition techniques. For example, the user 116 may be identified based on clothing recognition, gait recognition, facial recognition, detection of tags 206, weight data from weight sensors 122(6), and so forth. The different recognition techniques may be used in different situations or in succession. For example, clothing recognition and gait recognition may be used at greater distances between the user 116 and the imaging sensors 122(1) or when the user's 116 face is obscured from view by the imaging sensor 122(1). In comparison, as the user 116 approaches the imaging sensor 122(1) and their face is visible, facial recognition may be used. Once identified, such as by way of facial recognition, one or more of gait recognition or clothing recognition may be used by the inventory management module 328 or other modules to track the user 116 within the facility 102.

Other techniques such as artificial neural networks (ANN), active appearance models (AAM), active shape models (ASM), cascade classifiers, support vector machines, Haar detectors, local binary pattern (LBP) classifiers, and so forth, may also be used to process images. For example, the ANN may be trained using a supervised learning algorithm such that object identifiers are associated with images of particular objects within training images provided to the ANN. Once trained, the ANN may be provided with the images and may provide, as output, the object identifier.

Other modules 346 may also be present in the memory 316, as well as other data 348 in the data store 320. For example, the other modules 346 may include an accounting module. The accounting module may be configured to add or remove charges to an account based on movement of the items 104. The other data 348 may comprise information such as costs of the items 104 for use by the billing module.

Figure 4:
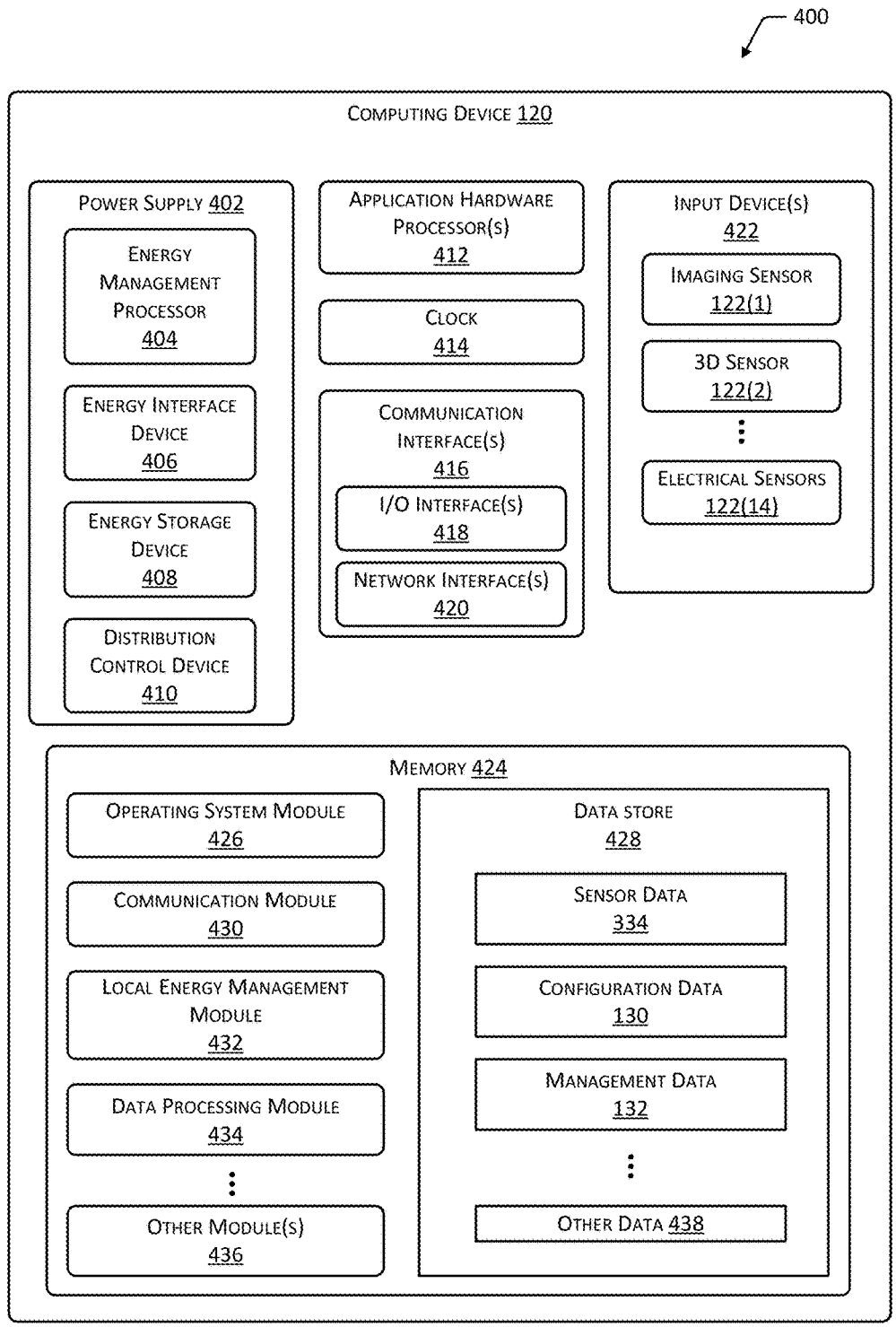
FIG. 4 illustrates a block diagram of a computing device configured to participate in the energy management system, according to some implementations.

FIG. 4 illustrates a block diagram 400 of the computing device 120 configured to participate in the energy management system 126, according to some implementations.

One or more power supplies 402 are configured to provide electrical energy suitable for operating the components in the computing device 120. The power supply 402 may comprise one or more of an energy management processor 404, an energy interface device 406, an energy storage device 408, or a distribution control device 410.

An energy management processor 404 may be configured to control operation of one or more of the energy interface device 406, the energy storage device 408, the distribution control device 410, or other components of the computing device 120. In one implementation, the energy management processor 404 may comprise a power management integrated circuit (PMIC). For example, the energy management processor 404 may comprise the TPS65910A PMIC from Texas Instruments, Inc. of Dallas, Tex., USA. In some implementations, the energy management processor 404 may include, or may be coupled to, a real-time clock. The energy management processor 404 may be able to perform one or more functions responsive to time data provided by the clock. For example, the energy management processor 404 may be configured to charge the energy storage device 408 during a particular timeslot as indicated by the timeslot designation data 344 described above. In another implementation, the energy management processor 404 may comprise one or more periodic programmable interval timers (PITs). The timeslot designation data 344 may be used to set an interval expressed by a first PIT and the duration of the interval may be specified by a second PIT. For example, the first PIT may have a first interval specified by the timeslot designation data 344. Upon reaching the first interval, the first PIT may generate an interrupt or other signal to start charging of the energy storage device 408. The duration of charging may be controlled by the second PIT, such that when the second PIT reaches a second interval, charging ceases. In still other implementations, the energy management processor 404 may comprise other circuit components such as a SE555 timer integrated circuit produced by Texas Instruments, Inc., the ICM7555 produced by Intersil Corporation, and so forth.

The energy interface device 406 may be configured to send, receive, or send and receive electrical energy. In one implementation, electrical energy may be acquired from a communication interface, such as a wired Ethernet connection providing energy over one or more of the wires. For example, the energy interface device 406 may be compliant with the least a portion of one or more power over Ethernet standards. In another implementation, the energy interface device 406 may comprise a wireless energy receiver configured to receive transmitted electrical energy. For example, the energy interface device 406 of the power supply 402 may include an inductive loop or capacitive plate configured to receive electrical energy from another inductive loop or capacitive plate external to the computing device 120.

The energy storage device 408 is configured to store energy. The energy stored by the energy storage device 408 may be acquired by the energy interface device 406. The energy storage device 408 may comprise one or more of a capacitor, inductor, battery, fuel cell, flywheel, and so forth.

The power supply 402 may include one or more distribution control devices 410. The distribution control devices 410 may provide power conditioning such as direct current (DC) to DC conversion, alternating current (AC) to DC conversion, voltage adjustment, frequency adjustment, and so forth. The distribution control device 410 may be configured to selectively distribute energy to different buses, interfaces, and so forth. The distribution control device 410 may be able to impose current limiting, voltage limiting, provide a switching matrix between different inputs and outputs, and so forth. The distribution control device 410 may also include circuitry to measure energy transfer, such as circuitry to measure voltage, current flow, and so forth.

For example, the switching matrix may enable the distribution control device 410 to be configured to pass energy that is present on the first network interface to the second network interface. In another example, the distribution control device 410 may be configured to impose one or more limits on energy transfer. Continuing the example, example, the distribution control device 410 may be configured to provide current limiting to a downstream device that is receiving energy from the computing device 120.

The distribution control device 410 may include current limiting circuitry within the energy interface device 406 to limit current draw from the network interfaces 420. For example, the limit may be responsive to management data 132 such as energy delivery authorization data 342 that may specify a maximum amount of energy to draw. The energy management processor 404 may also control demand for energy by controlling operation of one or more of the components of the computing device 120. For example, the energy management processor 404 may turn off particular components, place others into low power modes, and so forth to reduce demand for energy. Likewise, when energy is allocated and available, the energy management processor 404 may trigger other components to use more energy, such as signaling the application hardware processor 412 to wake up from a low power mode.

The computing device 120 may include one or more application hardware processors 412 ("processors") configured to execute one or more stored instructions. The processors 412 may comprise one or more cores of different types, functions, and so forth. For example, the processors 412 may include application processor units, graphic processing units, and so forth. In one implementation, the processor 412 may comprise the Tegra K1 processor from Nvidia Corporation of Santa Clara, Calif., USA. In another implementation, the processor 412 may comprise an Etron eSP870 processor from Etron Technology America, Inc. of Santa Clara, Calif., USA, configured to process the image data from two imaging sensors 122(1) and generate depth data.

One or more clocks 414 may provide information indicative of date, time, ticks, and so forth. For example, the energy management processor 404 or the processor 412 may use data from the clock 414 to generate timestamps, trigger a preprogrammed action, and so forth. In some implementations, the clock 414 may comprise a timer or counter that increments at an interval determined by an oscillating circuit. In some implementations the current time or other output of the clock 414 may be relative to an epoch. For example, the current time may comprise data indicative of "May 18, 2000 23:47:00.029". In other implementations the current time may be a counter output value such as "102933818". The clock 414 may also comprise a timer that generates an output signal upon reaching a programmed count.

The computing device 120 may include one or more communication interfaces 416, such as I/O interfaces 418, network interfaces 420, and so forth. The communication interfaces 416 enable the computing device 120, or components thereof, to communicate with other devices or components and may also be used to transfer energy. In some implementations, one or more of the communication interfaces 416 may be coupled to the energy interface device 406. For example, the first network interface 420(1) may couple to a first network 202(1) (or subnetwork thereof) that has an upstream device providing energy, and the second network interface 420(2) may couple to a second network 202(2) (or subnetwork of the first) that has a downstream device in need of energy. In another example, energy may be transferred from an I/O interface 418 to a network interface 420, or vice versa. The communication interfaces 416 may include one or more I/O interfaces 418. The I/O interfaces 418 may comprise I2C, SPI, USB, RS-232, and so forth.

The I/O interface(s) 418 may couple to one or more input devices 422. In some implementations, the computing device 120 may be a "headless" device, in that it may not have onboard any output devices 210. The input devices 422 may include sensors 122, such as the imaging sensors 122(1), 3D sensors 122(2), electrical sensors 122(14), and so forth. In one implementation, the computing device 120 may include a pair of imaging sensors 122(1) to provide stereoscopic infrared imaging, or a visible light (red-green-blue or "RGB") imaging sensor 122(1). For example, the stereoscopic infrared imaging sensors 122(1) may comprise an Aptina AR0134 from Aptina Imaging Corporation of San Jose, Calif., USA.

The input devices 422 may be at least partially physically incorporated within the computing device 120. In one implementation, the camera comprising the imaging sensor 122(1) or the 3D sensor 122(2) may be incorporated within an enclosure of the computing device 120. The enclosure may comprise a case, which may have an opening for light to enter to reach the sensor(s). In another implementation, at least a portion of the camera may be configured to pan, tilt, or rotate, relative to the enclosure. In yet another implementation, the computing device 120 may comprise a main enclosure attached to one or more secondary enclosures containing one or more of the input devices 422. For example, the imaging sensors 122(1) may be located within a separate enclosure and coupled by way of a cable to the main enclosure of the computing device 120.

The network interfaces 420 are configured to provide communications between the computing device 120 and other computing devices 120, routers, servers 204, access points 212, and so forth. The network interfaces 420 may include devices configured to couple to PANs, LANs, WANs, and so forth. For example, the network interfaces 420 may include devices compatible with Ethernet, Wi-Fi, Bluetooth, ZigBee, and so forth.

The computing device 120 may also include one or more busses or other internal communications hardware or software that allow for the transfer of data between the various modules and components of the computing device 120.

As shown in FIG. 4, the computing device 120 includes one or more memories 424. The memory 424 comprises one or more non-transitory CRSM as described above. The memory 424 provides storage of computer-readable instructions, data structures, program modules, and other data for the operation of the computing device 120. A few example functional modules are shown stored in the memory 424, although the same functionality may alternatively be implemented in hardware, firmware, or as a SoC.

The memory 424 may include at least one OS module 426. The OS module 426 is configured to manage hardware resource devices such as the communication interfaces 416, the input devices 422, and so forth, and provide various services to applications or modules executing on the processors 412. The OS module 426 may implement a variant of the FreeBSD operating system as promulgated by the FreeBSD Project; other UNIX or UNIX-like variants; a variation of the Linux™ operating system as promulgated by Linus Torvalds; the Windows operating system from Microsoft Corporation of Redmond, Wash., USA; and so forth.

In some implementations, a boot loader may be included in the OS module 426 or may be stored elsewhere in the memory 424. The boot loader is configured to bootstrap the computing device 120 on startup and load the OS module 426. In other implementations, the boot loader may be configured to load the OS module 426 or portions thereof from the network 202.

Also stored in the memory 424 may be a data store 428 and one or more of the following modules. These modules may be executed as foreground applications, background tasks, daemons, and so forth. The data store 428 may use a flat file, database, linked list, tree, executable code, script, or other data structure to store information. In some implementations, the data store 428 or a portion of the data store 428 may be distributed across one or more other devices including other computing devices 120, network attached storage devices, and so forth.

A communication module 430 may be configured to establish communications with one or more of the other computing devices 120, servers 204, or other devices. The communications may be authenticated, encrypted, and so forth.

A local energy management module 432 may be stored in the memory 424. The local energy management module 432 may be configured to manage energy consumption of the computing device 120. In some implementations, one or more of the functions of the local energy management module 432 may be executed at least in part on the energy management processor 404.

The local energy management module 432 may be configured to generate energy availability data 336, energy use data 338, energy request data 340, timeslot designation data 344, and so forth. For example, the local energy management module 432 may provide one or more of the data to the network energy management module 326. As described above, the network energy management module 326 may respond with energy delivery authorization data 342. Responsive to the energy delivery authorization data 342, the local energy management module 432 may modify operation of the computing device 120. For example, after receiving the energy delivery authorization data 342, the computing device 120 may transition to an operating mode that consumes more energy, utilizing the energy authorized by the network energy management module 326.

The local energy management module 432 may use the configuration data 130, the management data 132, or other data, such as described above, during operation. For example, the local energy management module 432 may receive energy request data 340 from a downstream computing device 120 and may respond with energy delivery authorization data 342.

The energy management system 126 may operate without input from the network energy management module 326. For example, the local energy management modules 432 for a plurality of computing devices 120 may operate in a peer-to-peer or collaborative fashion. In this implementation, the local energy management module 432 may control distribution of energy between network interfaces 420, control whether energy is distributed from the energy storage device 408 to a particular network interface 420 or a downstream computing device 120 attached thereto, and so forth.

The memory 424 may also store a data processing module 434. The data processing module 434 may provide one or more functions, such as image processing, data compression, data analysis, and so forth. The data processing module 434 may be configured to generate sensor data 334 based on one or more of the input devices 422.

Other modules 436 may also be present in the memory 424, as well as other data 438 in the data store 428.

Figure 5:
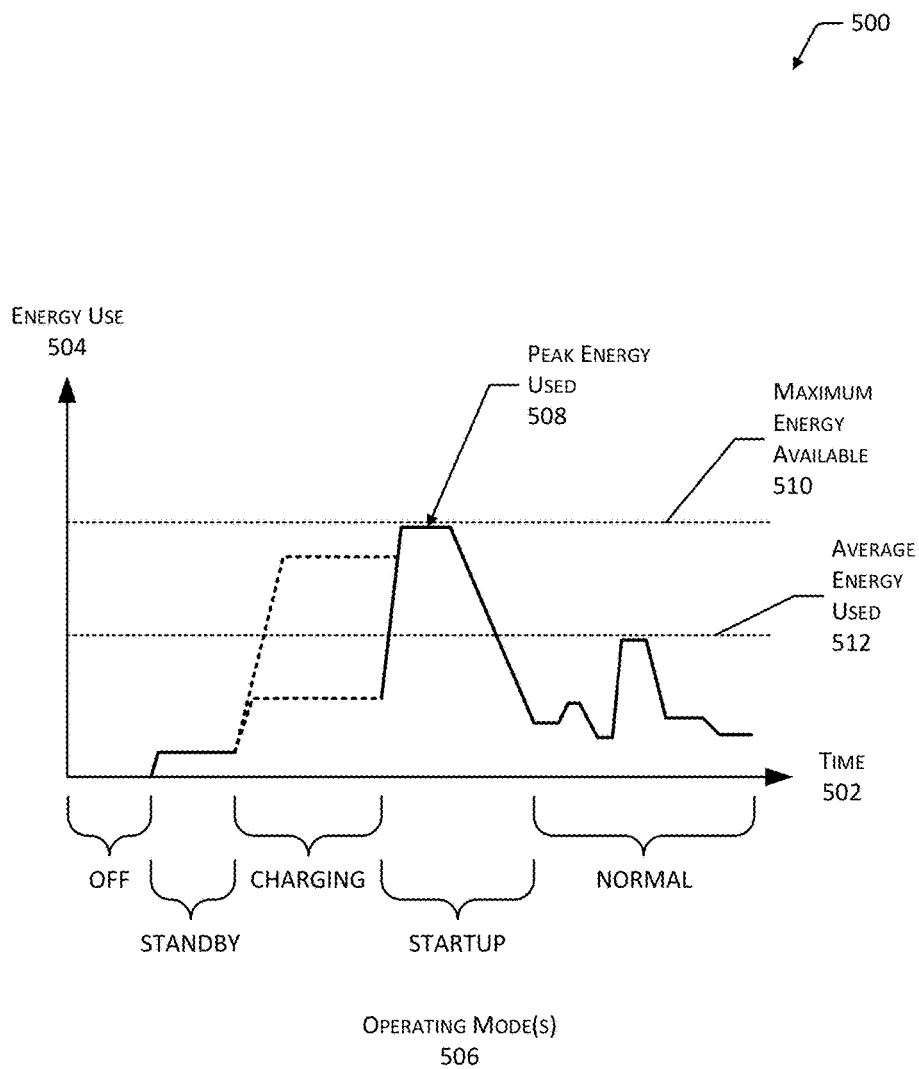
FIG. 5 illustrates a graph of energy use over time for the computing device while operating in different operating modes, according to some implementations.

FIG. 5 illustrates a graph 500 of energy use over time for the computing device 120 while operating in different operating modes, according to some implementations.

The graph 500 comprises a horizontal axis indicative of time 502 and a vertical axis indicative of energy use 504. At different intervals of time 502, different operating modes 506 are designated. The different operating modes 506 are indicative of different conditions in which the computing device 120 may function. The operating modes 506 depicted here include off, standby, charging, startup, and normal.

When the computing device 120 is in the off operating mode 506, it consumes no energy from an external source, and internal devices may be quiescent or inactive.

When the computing device 120 is in the standby mode, some minimal functionality may be performed by components within the computing device 120. For example, while in standby mode the energy management processor 404 may be awaiting a wakeup signal, waiting for the current time to correspond to the timeslot designation data 344, and so forth. In another example, standby mode may comprise the application hardware processor 412 being in a low energy mode.

When the computing device 120 is in the charging operating mode, the computing device 120, or portion thereof such as the energy supply 402, may be charging one or more of the energy storage devices 408. For example, during the charging operating mode, energy may be obtained from the network interface 420 using an energy interface device 406, and the energy may be used to charge the energy storage device 408. In this graph, the charging mode is indicated by dotted lines, one indicating a higher level of energy use 504 relative to the other. Depending upon the desired operation of the network energy management module 326, the local energy management module 432, or both, the energy use 504 during charging may be set to a relatively low level or a relatively high level. This is discussed in more detail below with regard to FIGS. 7-13.

When the computing device 120 is in the startup mode, the energy management processor 404 or other components of the computing device 120 may be operable to transition the computing device 120 to an operational state and otherwise begin executing computer executable instructions that are stored in the memory 424. Energy consumption by the computing device 120 may peak during the startup operating mode 506. For example, additional energy may be used initially to bias semiconductors, charge capacitors, and so forth. Furthermore, the tasks demanded of the components of the computing device 120 during startup may be such that many or all are simultaneously active, active at a maximum available speed, and so forth. For example, the startup may comprise executing a boot loader using the application hardware processor 412, executing the operating system module 426 using the application hardware processor 412, activating the one or more sensors 122, and so forth. As a result, peak energy used 508 may occur during the startup operating mode 506.

The peak energy used 508 may approach or reach the maximum energy available 510. The maximum energy available 510 may comprise an upper limit on the amount of energy that may be transferred to the computing device 120. For example, the maximum energy available 510 may comprise an upper limit as dictated by one of the power over Ethernet specifications. The maximum energy available 510 may be constrained by one or more factors such as electrical conductor size, voltage, frequency, electrical resistance, safety factors, regulatory limitations, and so forth.

While the computing device 120 is in the normal operating mode, one or more of the individual components of the computing device 120 may be in different energy states. For example, the application hardware processor 412 may transition between different clock speeds depending upon the tasks to be executed. Likewise, some of the components may use various energy saving techniques and thus may transition between an operating state and a low energy state.

Also depicted in the graph 500 is an average energy used 512. As indicated by the curve in the graph 500, energy use 504 may vary over time 502 and may even vary within a span of time designated as a particular operating mode. For example, during the startup operating mode 506, energy use 504 quickly escalates to the peak energy used 508 where it remains for a time, and then ramps down to a lower level. During the normal operating mode 506, various increases and decreases are shown as the energy requirements of the computing device 120 change. The average energy used 512 depicted in FIG. 5 is less than the maximum energy available 510 and also less than the peak energy used 508. By using some of the techniques described in this disclosure, the peak energy used 508 by a particular computing device 120 may be coordinated to occur at a particular time when capacity to handle such a peak may be provided for, such as when timeslots are used to distribute energy. By using other techniques described in this disclosure, peak energy used 508 may be decreased in amplitude by using energy from the energy storage device 408 to reduce instantaneous or short-term demands on an upstream device that is providing energy to the computing device 120.

In other implementations, the computing device 120 may exhibit other operating modes 506. Furthermore, the shape of the curve presented here is provided for illustrative purposes and not by way of a limitation. The curve of energy use 504 over time 502 may vary between different types of computing devices 120, between the same type of computing devices 120 that are configured differently, and so forth.

Figure 6:
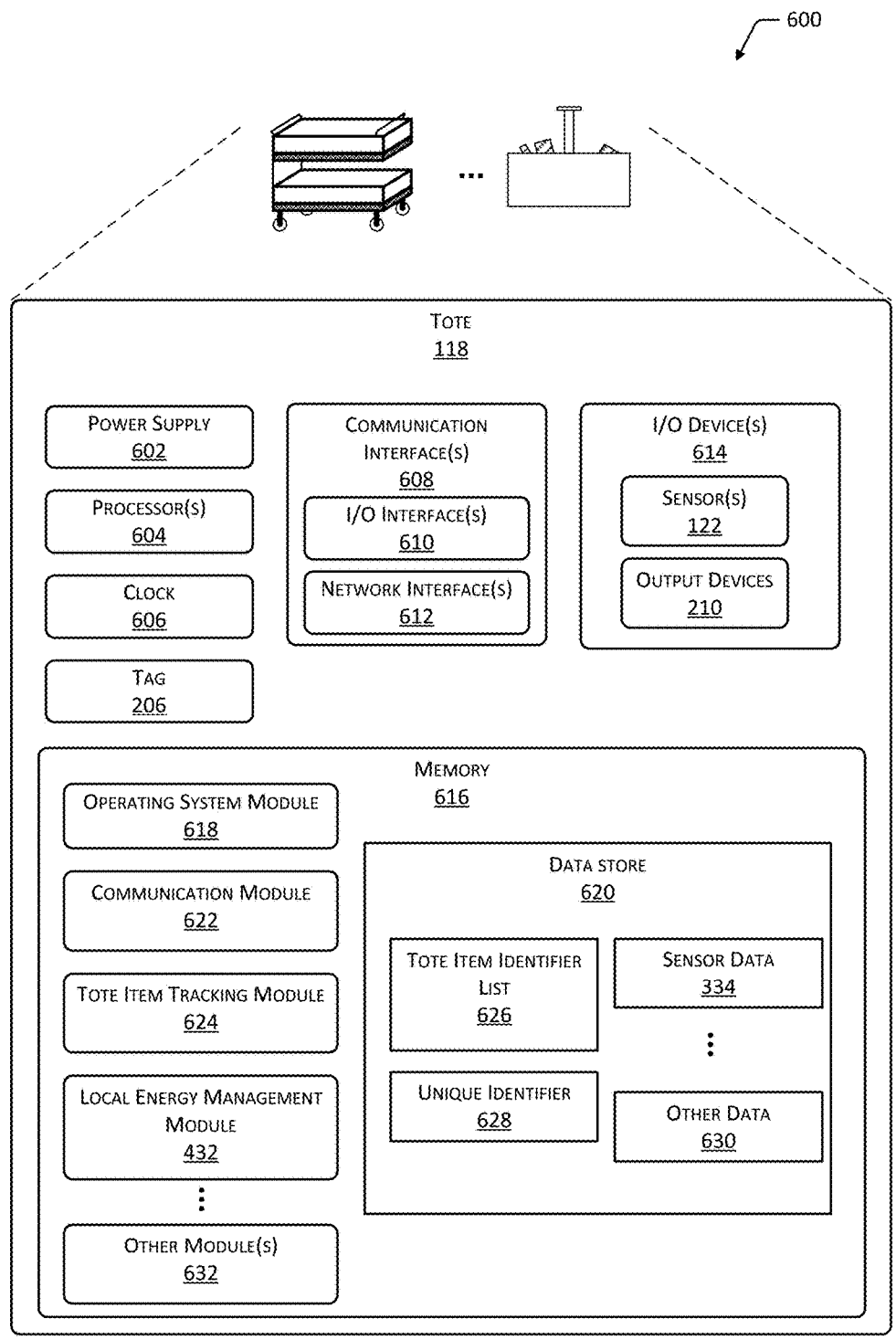
FIG. 6 illustrates a block diagram of a tote, according to some implementations.

FIG. 6 illustrates a block diagram 600 of the tote 118, according to some implementations. The tote 118 may include a tag 206. The tag 206 may be affixed to, integral with, or otherwise associated with the tote 118. In some implementations, the tote 118 may have identifiers or other indicia thereupon. For example, a machine-readable optical code, such as a barcode, may be affixed to a side of the tote 118.

The tote 118 may also include a power supply 602. The power supply 602 may be configured to provide electrical energy suitable for operating the components in the tote 118. The power supply 602 may comprise one or more of photovoltaic cells, batteries, wireless energy receivers, fuel cells, flywheels, capacitors, other components as described above with regard to power supply 402, and so forth.

The tote 118 may include one or more hardware processors 604 (processors) configured to execute one or more stored instructions. The processors 604 may comprise one or more cores of different types. For example, the processors 604 may include application processor units, graphic processing units, and so forth.

One or more clocks 606 may provide information indicative of date, time, ticks, and so forth. For example, the processor 604 may use data from the clock 606 to generate timestamps, trigger a preprogrammed action, and so forth.

The tote 118 may include one or more communication interfaces 608, such as I/O interfaces 610, network interfaces 612, and so forth. The communication interfaces 608 may enable the tote 118, or components thereof, to communicate with other devices or components. The communication interfaces 608 may include one or more I/O interfaces 610. The I/O interfaces 610 may comprise I2C, SPI, USB, RS-232, and so forth.

The I/O interface(s) 610 may couple to one or more I/O devices 614. The I/O devices 614 may include one or more of the input devices such as the sensors 122. As described above, the sensors 122 may include imaging sensors 122(1), weight sensors 122(6), RFID readers 122(8), and so forth. The I/O devices 614 may also include output devices 210 such as haptic output devices 210(1), audio output devices 210(2), display output devices 210(3), and so forth. For example, the tote 118 may include other output devices 210(T) such as lights that may be activated to provide information to the user 116. In some implementations, I/O devices 614 may be combined. For example, a touchscreen display may incorporate a touch sensor 122(4) and a display output device 210(3). In some embodiments, the I/O devices 614 may be physically incorporated with the tote 118 or may be externally placed.

The network interfaces 612 are configured to provide communications between the tote 118 and other computing devices 120, totes 118, routers, servers 204, access points 212, and so forth. The network interfaces 612 may include devices configured to couple to PANs, LANs, WANs, and so forth, that are wired or wireless. For example, the network interfaces 612 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 6, the tote 118 includes one or more memories 616. The memory 616 comprises one or more non-transitory CRSM as described above. The memory 616 provides storage of computer-readable instructions, data structures, program modules, and other data for the operation of the tote 118. A few example functional modules are shown stored in the memory 616, although the same functionality may alternatively be implemented in hardware, firmware, or as a SoC.

The memory 616 may include at least one OS module 618. The OS module 618 is configured to manage hardware resource devices such as the communication interfaces 608, the I/O devices 614, and so forth, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including over totes 118, computing devices 120, network attached storage devices, and so forth.

A communication module 622 may be configured to establish communications with one or more of the other totes 118, the computing devices 120, servers 204, or other devices. The communications may be authenticated, encrypted, and so forth.

The memory 616 may also store a tote item tracking module 624. The tote item tracking module 624 may be configured to maintain a list of items 104, which are associated with the tote 118. For example, the tote item tracking module 624 may receive input from a user 116 by way of a touch screen display with which the user 116 may enter information indicative of the item 104 placed in the tote 118. In another example, the tote item tracking module 624 may receive input from the I/O devices 614, such as the weight sensor 122(6) and an RFID reader 122(8). The tote item tracking module 624 may send the list of items 104 to the inventory management system 124. The tote item tracking module 624 may also be configured to receive information from the inventory management system 124. For example, a list of items 104 to be picked may be presented within a user interface on the display output device 210(3) of the tote 118.

The memory 616 may include a local energy management module 432 such as described above. The local energy management module 432 may be configured to perform one or more the energy management functions described herein.

The data store 620 may store a tote item identifier list 626. The tote item identifier list 626 may comprise data indicating one or more items 104 associated with the tote 118. For example, the tote item identifier list 626 may indicate the items 104 that are present in the tote 118. The tote item tracking module 624 may generate or otherwise maintain a tote item identifier list 626.

A unique identifier 628 may also be stored in the memory 616. In some implementations, the unique identifier 628 may be stored in rewritable memory, write-once-read-only memory, and so forth. For example, the unique identifier 628 may be burned into a one-time programmable, non-volatile memory, such as a programmable read-only memory (PROM). In some implementations, the unique identifier 628 may be part of a communication interface 608. For example, the unique identifier 628 may comprise a media access control (MAC) address associated with a Bluetooth interface. In some implementations, a user interface module may use the unique identifier 628 to determine upon which tote 118 to generate the user interface. In other implementations, the user interface module may use the unique identifier 628 to determine a source for the sensor data 334.

The data store 620 may also store sensor data 334. The sensor data 334 may be acquired from the sensors 122 onboard the tote 118. The user interface data received by the tote 118 may also be stored in the data store 620.

Other data 630 may also be stored within the data store 620. For example, tote configuration settings, user interface preferences, and so forth, may also be stored within the data store 620.

Other modules 632 may also be stored within the memory 616. In one implementation, a data handler module may be configured to generate sensor data 334. For example, an imaging sensor 122(1) onboard the tote 118 may acquire image data and one or more microphones 122(5) onboard the tote 118 may acquire audio data. The sensor data 334, or information based thereon, may be provided to the data handler module.

The other modules 632 may also include a user authentication module that may be configured to receive input and authenticate or identify a particular user 116. For example, the user 116 may enter a personal identification number (PIN) or may provide a fingerprint to the fingerprint reader to establish identity.

Figure 7:
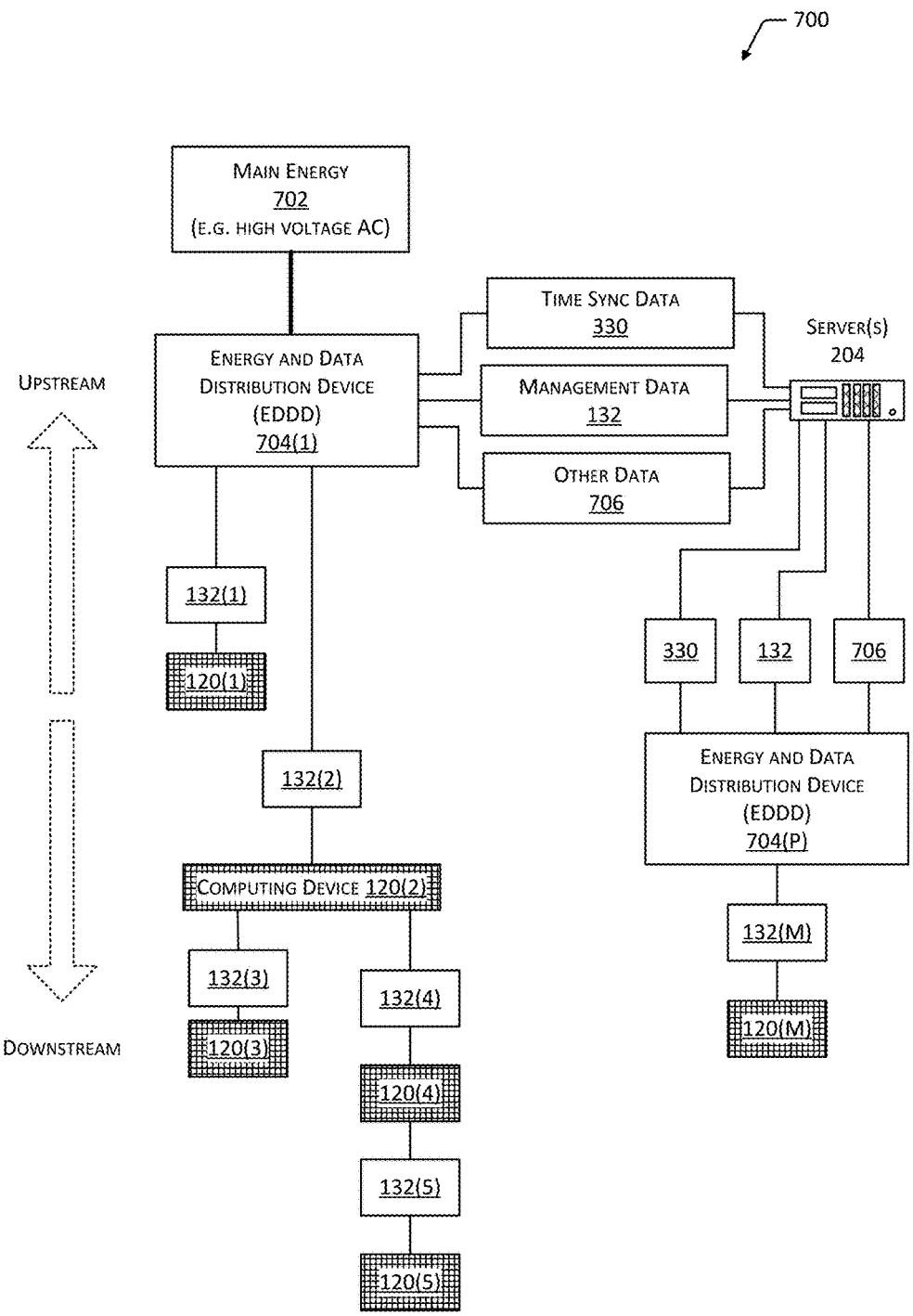
FIG. 7 illustrates a block diagram of elements of an energy distribution infrastructure and the energy management system interacting with the computing devices, according to some implementations.

FIG. 7 illustrates a block diagram 700 of elements of energy distribution infrastructure and the energy management system 126 interacting with the computing devices 120, according to some implementations.

The energy distribution infrastructure of the facility 102 includes main energy 702. The main energy 702 may comprise high-voltage alternating current ("AC") such as delivered from an electric utility, direct-current ("DC") as provided from a building energy system such as a solar array, and so forth. The energy described in this disclosure may comprise electrical energy, optical energy, magnetic energy, and so forth. For example, the network 202 may comprise optical fiber used to transmit data using optical signals, and the energy may be transferred as light. In one implementation, the consuming device such as the computing device 102 may convert the light into electricity, such as with a photovoltaic cell, to operate the components therein. In another implementation, the consuming device may utilize the light to perform functions. For example, the application hardware processor 412 may comprise an optical processor that uses energy in the form of light to perform computational operations.

The energy distribution infrastructure of the facility 102 may comprise one or more energy and data distribution devices ("EDDD") 704(1), 704(2), . . . , 704(P). The EDDD 704 may obtain energy from another source, such as the main energy 702. The EDDD 704 may be used to communicatively couple the computing devices 120 to the network 202 to support data communication and supply energy to one or more computing devices 120(1), 120(2), . . . , 120(M). For example, the EDDD 704 may comprise an Ethernet switch that includes Power over Ethernet (POE) injectors. In another example, the EDDD 704 may comprise a powered USB hub.

Energy may be provided from the EDDD 704 to the computing devices 120 along with data connectivity using various techniques in which electrical energy is delivered along one or more of the conductors present in the data network cabling. The computing device 120 may then couple to a port on the EDDD 704 by way of data cabling to establish a network connection with other devices such as the computing devices 120 and receive energy.

The total energy that the EDDD 704 is able to provide to a plurality of connected computing devices 120 is constrained. For example, the energy supply of the EDDD 704 has a maximum amount of energy that can be drawn from the main energy 702. Similarly, the total energy that the EDDD 704 is able to provide to a particular port and to the particular computing device 120 coupled to that port is further constrained. For example, the POE injector that services a particular port may be current-limited to a maximum value for regulatory or safety reasons.

The EDDD 704 may be capable of selectively distributing energy to particular ports. For example, the EDDD 704 may offer port level current limiting, voltage limiting, field effect transistor (FET) switches to a common electrical bus or matrix, and so forth. Continuing the example, responsive to energy delivery authorization data 342, or instructions provided by another device, the EDDD 704(1) may be configured to provide current-limiting to two-thirds of the maximum available current to the port to which the computing device 120(2) is connected.

The network 202 may comprise the interconnections provided by the EDDD 704, or other network devices such as switches, bridges, routers, and so forth. The server 204 may be coupled to the EDDD 704 by way of the network 202. As described above, the server 204 may send and receive data to one or more of the devices on the network 202. For example, the server 204 may distribute time sync data 330 to the devices connected to the network 202. As described above, the time sync data 330 may be used to coordinate the clocks 414 of the computing device 120, including one or more real-time clocks of the energy management processor 404.

The management data 132 may also be exchanged between the server 204 and other devices such as the EDDD 704, the computing devices 120, and so forth. For example, the EDDD 704 may provide energy availability data 336 and energy use data 338 to the server 204. The computing devices 120 may provide energy request data 340 to the network energy management module 326.

For convenience of discussion, and not necessarily as a limitation, depicted here are arrows designating upstream and downstream with respect to how energy is delivered through the network 202. For example, an upstream device is one that is providing energy while a downstream device is one that receives energy. In this illustration, relative to the EDDD 704(1), the computing device 120(2) is a downstream device. Similarly, relative to the computing device 120(2), the EDDD 704(1) is an upstream device.

In some implementations, the computing devices 120 may operate in conjunction with one another, and management data 132 may be exchanged between computing devices 120. These implementations may operate in conjunction with the server 204, or independently thereof. For example, the server 204 may operate a network energy management module 326. During a startup of the devices on the network 202 such as after an energy outage, the network energy management module 326 may begin to selectively distribute available energy to particular computing devices 120. Continuing the example, the server 204 may provide energy delivery authorization data 342 or may utilize timeslot designation data 344 to provide energy to the computing device 120(1) at a first time while preventing energy distribution to the computing device 120(2). Once the computing device 120(1) has drawn a predetermined amount of energy, energy may be reallocated to the computing device 120(2). In the implementation where the computing devices 120 operate in a collaborative fashion, the computing device 120(2) may control distribution of the energy made available by the EDDD 704(1) to downstream devices such as the computing device 120(3), 120(4), and 120(5). In other implementations, the network energy management module 326 executing on each of the individual computing devices 120 may direct the energy consumption or provisioning for that individual computing device 120.

During operation, the energy management system 126 may be configured to provide for graceful restarts or graceful degradation. For example, when energy available at the EDDD 704 decreases, the energy management system 126 may selectively change the operating mode 506 of particular computing devices 120. Continuing the example, the computing devices 120 may transition from a normal operating mode 506 to a standby operating mode 506. The selection of operating mode 506, computing devices 120, and so forth, may be, as described above, based on one or more of the physical layout data 332, the electrical layout data 128, the sensor data 334, the configuration data 130, the management data 132, and so forth. For example, computing devices 120 in unoccupied portions of the facility 102 may be transitioned to the off operating mode 506. Meanwhile, those computing devices 120 adjacent to an occupied portion of the facility 102 may be transitioned to a standby operating mode 506. Continuing the example, the computing devices 120 in occupied portions may remain at the normal operating mode 506. Should further reductions in energy consumption be called for, subsets or portions of the computing devices 120 may either be configured to operate in the lower energy mode (such as using a lower clock speed of the application hardware processor 412) or transitioned to an operating mode 506 with ceaseless energy.

In a similar fashion, during a restart of the systems of the facility 102, energy may be selectively distributed using the energy management system 126 to restart particular computing devices 120. In this way, the energy distribution infrastructure may be utilized to reduce or eliminate conditions in which energy demand or consumption exceed available energy capacity.

Figure 8:
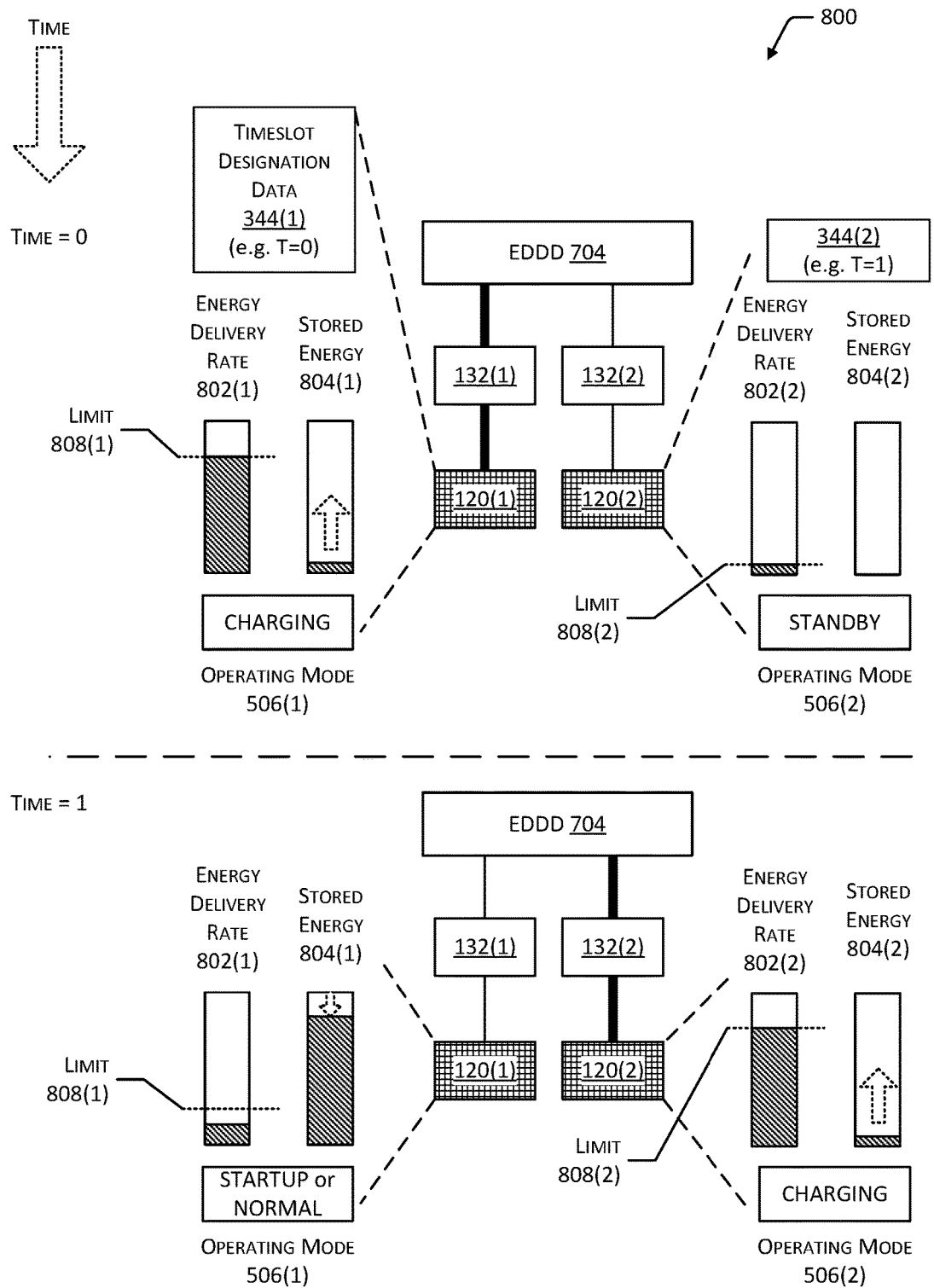
FIG. 8 illustrates a block diagram of the energy management system controlling charging of energy storage devices of particular computing devices based on timeslots, according to some implementations.

FIG. 8 illustrates a block diagram 800 of the energy management system 126 controlling charging of energy storage devices 408 of particular computing devices 120 based on timeslots, according to some implementations. Depicted is a portion of the energy distribution infrastructure, the EDDD 704, and two downstream computing devices 120(1) and 120(2). The server 204 or other elements of the infrastructure are omitted from this figure for clarity, and not necessarily as a limitation.

In this illustration, time increases down the page, as indicated by the arrow. A first snapshot of the system at a first time=0 is depicted. A second snapshot of the system at a later second time=1 is also depicted.

In the implementation depicted here, the energy management system 126 may be configured to provide relatively high levels of energy delivery to a subset of the computing devices 120 at particular timeslots. During a timeslot associated with a particular computing device 120, the energy is used to charge the energy storage device 408.

An energy delivery rate 802 is depicted as a bar chart. Stored energy 804 in an energy storage device 408 is also depicted as a bar chart. In some implementations, the energy management system 126 may impose a limit 808. For example, the limit 808 may correspond to the maximum available energy transfer supported by the infrastructure, or may be set to a level less than the maximum to provide some headroom in the event of an unexpected spike.

At time=0, as depicted here, the timeslot designation data 344(1) associated with computing device 120(1) indicates an assigned timeslot of T=0. The timeslot designation data 344(1) may be received as part of management data 132(1) exchanged between the computing device 120(1) and the server 204. As a result, the energy management processor 404(1) onboard the computing device 120(1) proceeds to charge the energy storage device 408(1) therein. The energy delivery rate 802(1) of the computing device 120(1) during time=0 is at a high rate, up to a limit 808(1) that has been imposed. Stored energy 804(1) within the energy storage device 408(1) of the computing device 120(1) is increasing, and the operating mode 506(1) is designated as charging.

The second computing device 120(2) has received timeslot designation data 344(2) indicating that it is to wait until time=1 to enter the charging mode. At time=0, the computing device 120(2) is an operating mode 506(2) such as standby. Energy delivery rate 802(2) is relatively low compared to the energy delivery rate 802(1) at the same time, and may be zero such as when the operating mode 506(2) is off. No stored energy 804(2) is available in the energy storage devices 408(2) of the second computing device 120(2). In effect, at time=0, the second computing device 120(2) is awaiting its turn to charge.

At time=1, the energy delivery rate 802(1) has been decreased significantly, while the energy delivery rate 802(2) has been increased. Energy is now being allocated for distribution to the second computing device 120(2). As a result, the second computing device 120(2) may transition to the operating mode 506(2) of charging, and may begin to accumulate stored energy 804(2) in the energy storage devices 408(2).

Meanwhile at time=1, if so configured, the first computing device 120(1) may transition to another operating mode 506(1), such as startup or normal. The stored energy 804(1) begins to be depleted somewhat as the first computing device 120(1) draws upon that stored energy 804(1) from the energy storage devices 408(1). The first computing device 120(1) may continue to draw energy from the EDDD 704, albeit at a much lower energy delivery rate, due to the utilization of the stored energy 804(1).

By using the technique described herein, the computing devices 120 may be provided with energy in an orderly fashion, allowing the computing devices 120 to transition between operating modes 506 in stages. By using the energy storage device 408 on the respective computing devices 120, the peak energy used 508 by an individual computing device 120 is reduced. By segregating the delivery of energy to the computing devices 120 into different groups using the timeslots, the situation is avoided wherein too many computing devices 120 attempt to draw more energy than can be provided by the EDDD 704.

Figure 9:
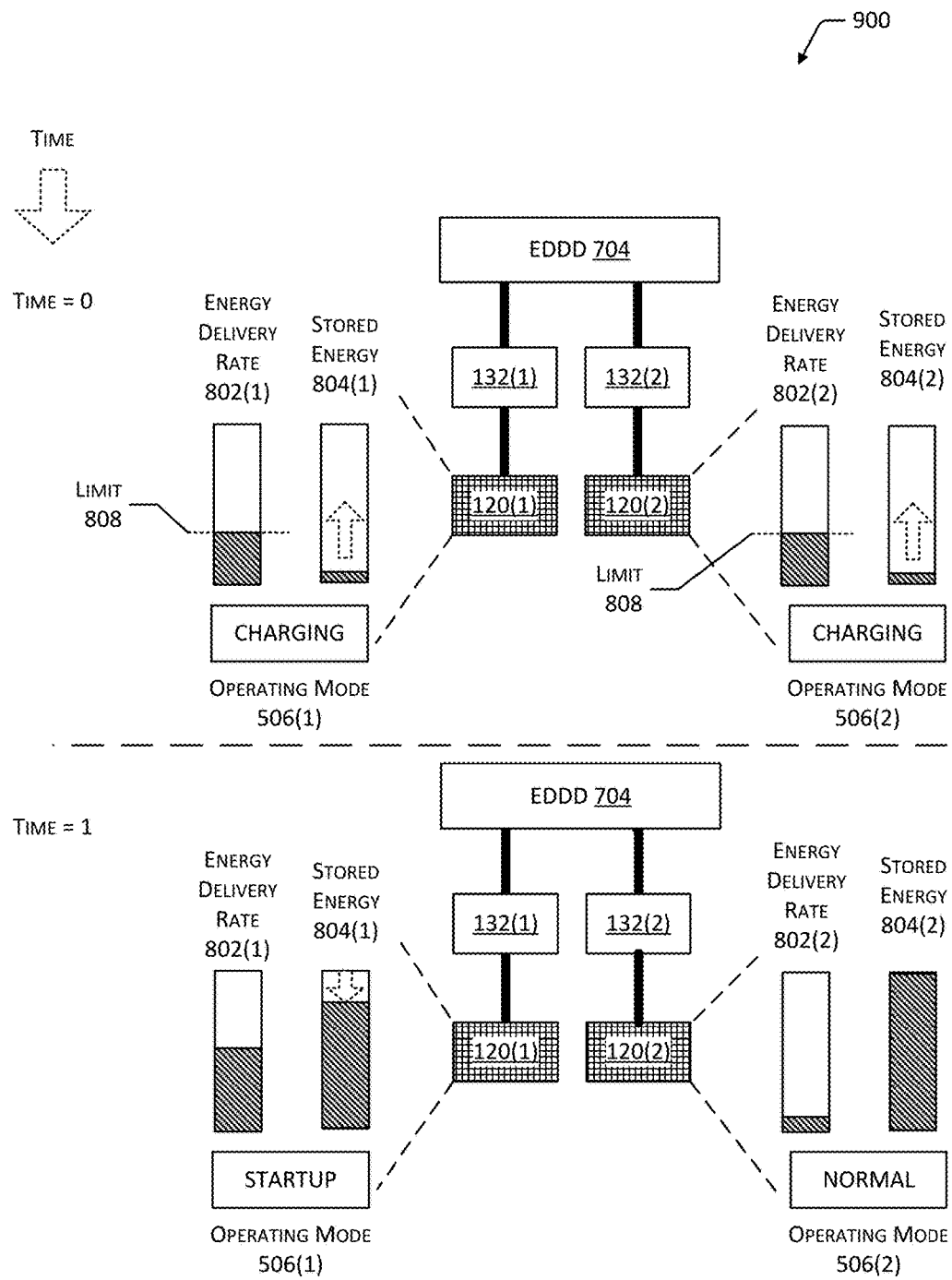
FIG. 9 illustrates a block diagram of the energy management system limiting the energy delivery rate to a plurality of devices, then rescinding that limit, according to some implementations.

FIG. 9 illustrates a block diagram 900 of the energy management system 126 limiting energy delivery rate 802 to a plurality of computing devices 120, then rescinding that limit, according to some implementations. Depicted is a portion of the energy distribution infrastructure, the EDDD 704, and two downstream computing devices 120(1) and 120(2). The server 204 or other elements of the infrastructure are omitted from this figure for clarity, and not necessarily as a limitation.

In this illustration, time increases down the page as indicated by the arrow. A first snapshot of the system at a first time=0 is depicted. A second snapshot of the system at a later second time=1 is also depicted.

In the implementation depicted here, at time=0, the energy management system 126 has set a limit 808 on the energy delivery rate 802 for at least a subset of the computing devices 120. For example, both the first computing device 120(1) and the second computing device 120(2) may be provided with energy at the same energy delivery rate 802, such that 802(1) and 802(2) are at least about equal and both computing devices 120 are subject to the same limit 808. The limit 808 of the energy delivery rate 802 may be sufficient for the computing device 120 to transition from a first operating mode 506 to second operating mode 506. For example, both the first computing device 120(1) and the second computing device 120(2) may be in the charging operating mode 506.

The computing devices 120 may be responsive to energy delivery authorization data 342, such as provided by the server 204 or the EDDD 704. The energy delivery authorization data 342 may specify a maximum limit of energy that the computing device 120 is permitted to draw. Responsive to the limit indicated by the energy delivery authorization data 342, the computing device 120 may perform one or more actions to reduce energy consumption to levels that are at or below the limit specified. For example, the computing device 120 may reduce clock speed of an application hardware processor, discontinue charging of an energy storage device, or place one or more sensors into a low power mode.

The energy management system 126 may determine that the limit 808 may be rescinded. In one implementation, the determination may be based on the energy storage devices 408 of the respective computing devices 120 reaching a predetermined level of stored energy 804. For example, the computing devices 120 may provide management data 132 such as energy availability data 336 indicating the amount of stored energy 804. If the amount of stored energy 804 has reached a threshold level, the computing device 120 may be deemed to be ready to transition to a different operating mode 506.

In another implementation, the determination that the limit 808 may be rescinded may be based upon an amount of time that energy was provided. For example, the configuration data 130 may specify that the energy storage device 408 is deemed to be at full capacity when charged for a threshold amount of time of 2000 ms. With this implementation, once the total amount of time that energy has been delivered to a particular computing device 120 meets or exceeds the threshold amount of time, the energy storage device 408 may be deemed to be charged.

At time=1, the limit 808 has been rescinded, and the computing devices 120 may be provided with energy at different energy delivery rates 802. In this illustration, the first computing device 120(1) is using some of the stored energy 804(1) and drawing some energy from the EDDD 704 such that its energy delivery rate 802(1) has increased to transition to the operating mode 506(1) of startup. Meanwhile, the second computing device 120(2) may be in the operating mode 506(2) of normal, and the energy delivery rate 802(2) has subsequently decreased. The two computing devices 120(1) and 120(2) may be in different operating modes 506 based on differences in their hardware, operating systems, startup tasks, and so forth.

By using the technique described in this figure to charge the energy storage devices 408 onboard computing device 120, surges in demand for energy from the EDDD 704 or another upstream device may be reduced or eliminated.

Figure 10:
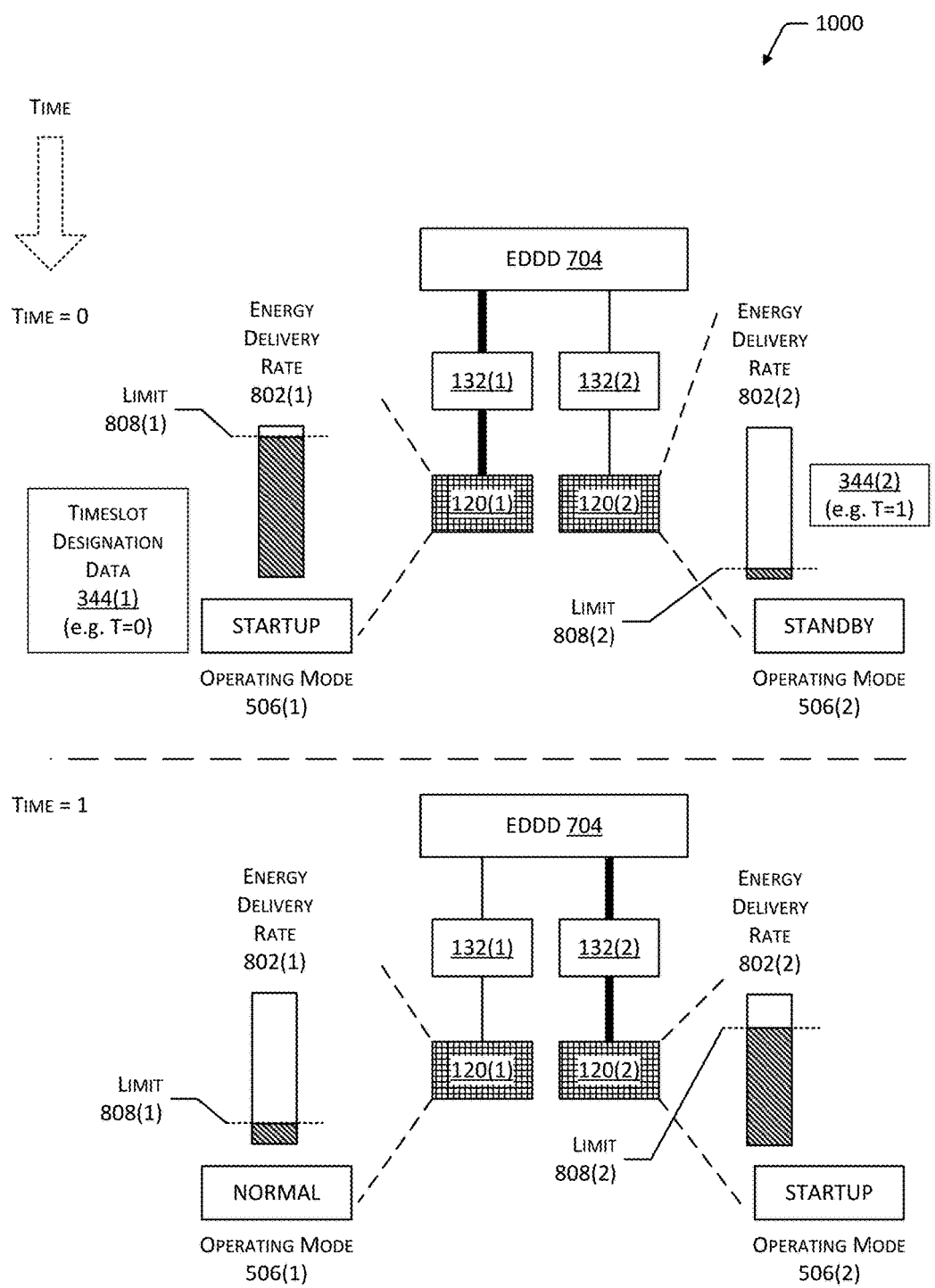
FIG. 10 illustrates a block diagram of the energy management system limiting energy delivery based on a timeslot, according to some implementations.

FIG. 10 illustrates a block diagram 1000 of the energy management system 126 limiting energy delivery rate 802 based on timeslot, according to some implementations. Depicted is a portion of the energy distribution infrastructure, the EDDD 704, and two downstream computing devices 120(1) and 120(2). The server 204 or other elements of the infrastructure are omitted from this figure for clarity, and not necessarily as a limitation.

In this illustration, time increases down the page as indicated by the arrow. A first snapshot of the system at a first time=0 is depicted. A second snapshot of the system at a later second time=1 is also depicted.

In the implementation depicted here, the energy management system 126 may be configured to provide relatively high levels of energy to a subset of the computing devices 120 at particular timeslots, similar to that described above with regard to FIG. 8. However, unlike the system of FIG. 8, the computing devices 120 do not have energy storage devices 408 or may not be configured to charge the energy storage device 408 at this time. The computing devices 120 may have some very limited energy storage capability, such as from parasitic capacitance of circuit elements, capacitors as part of the energy management processor 404, energy interface device 406, distribution control devices 410, and so forth. However, compared to the energy storage device 408, this very limited energy storage capability is significantly smaller.

At time=0, the energy delivery rate 802(1) of the first computing device 120(1) that has a timeslot designation data 344(1) corresponding to time=0 is at the limit 808(1). By utilizing the energy being delivered, the first computing device 120(1) has transitioned to an operating mode 506(1) of startup. Meanwhile at time=0, the energy delivery rate 802(2) of the second computing device 120(2) is very low, and this device remains in an operating mode 506(2) of standby or off.

In some implementations, the limit 808 imposed on the computing devices 120 that are outside of the current timeslot may be very low or zero. For example, the limit 808(2) may be set to an energy delivery rate 802(2) that allows the second computing device 120(2) to remain in the standby operating mode 506(2).

At time=1, time has moved on and the energy delivery rate 802(1) for the first computing device 120(1) has been reduced to a lower limit 808(1). Meanwhile, energy delivery rate 802(2) for the second computing device 120(2) has increased to the higher limit 808(2) now that the timeslot designation 344(2) corresponds to the current time.

In some implementations, the limit 808 may vary over time, may vary between computing devices 120, and so forth. For example, the limit 808(1) at time=1 may be greater than the limit 802(2) at time=0. The limit 808 associated with a particular computing device 120 or group of computing devices 120 may be determined based on one or more factors including, but not limited to, make and model of the computing device 120, tasks executing on the computing device 120, sensors 122 coupled to the computing device 120, and so forth.

The techniques described above with respect to FIGS. 8-10 may be combined or used in conjunction with one another. Furthermore, the techniques described may be directed from a central administration point such as the server 204 executing the network energy management module 326, may be operated in a collaborative or peer-to-peer system between computing devices 120, or a combination thereof.

Illustrative Processes

Figure 11:
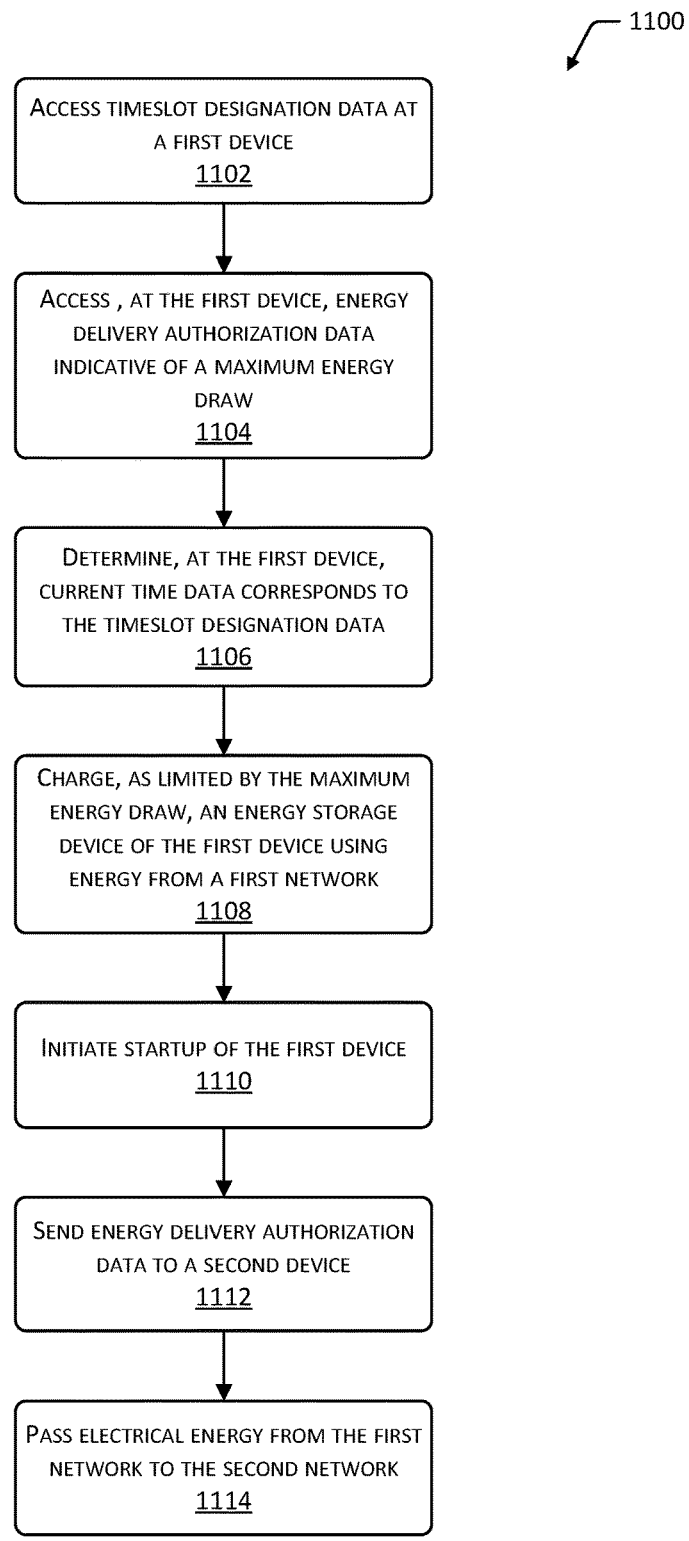
FIG. 11 depicts a flow diagram of a process of controlling charging of energy storage devices based on timeslots, according to some implementations.

FIG. 11 depicts a flow diagram 1100 of a process of controlling charging of energy storage devices 408 based on timeslots, according to some implementations. The process may be performed at least in part by the network energy management module 326, the local energy management module 432, another module, or combination thereof.

Block 1102 accesses timeslot designation data 344 at a first computing device 120(1). As described above, the timeslot designation data 344 may be indicative of a periodically recurring timeslot during which the computing device 120 will be provided with energy. In one implementation, the timeslot designation data 344 may be received from another device, such as the server 204. In another implementation, the timeslot designation data 344 may be generated by the local energy management module 432. For example, based on information indicative of the peak energy draw by particular computing devices 120, timeslots may be designated to provide a load from combined computing devices 120 in the same timeslot that is below a maximum value.

The timeslot designation data 344 may be based at least in part on one or more of the following: a location of at least a portion of the computing device 120 within the facility 102, a location of the computing device 120 relative to another computing device 120, a priority level associated with the computing device 120, an identifier associated with at least a portion of the computing device 120 (such as a MAC address, processor identifier, and so forth), other data or values stored by or derived from the server 204 or the computing device 120, and so forth.

Block 1104, at the first computing device 120(1), accesses energy delivery authorization data 342 indicative of a maximum energy draw to be obtained from a first network 202(1) (or subnet of the network 202) that a first communication interface 416(1) is coupled to. In one implementation, the energy delivery authorization data 342 may be received from another device, such as the server 204 or another computing device 120. In another implementation, the energy delivery authorization data 342 may be generated by the local energy management module 432.

Block 1106, at the first computing device 120(1), determines current time data corresponds to the timeslot designation data 344. For example, the clock 414 may indicate a time that is within an interval specified by the timeslot designation data 344.

Block 1108, at the first computing device 120(1), charges the energy storage device 408 of the first computing device 120(1) to a predetermined level of stored electrical energy, using energy received from the first network 202(1). For example, an energy storage device 408 may comprise one or more capacitors that are charged by the energy received from an upstream device such as the EDDD 704. In some implementations, the energy draw during the charging may be limited to the maximum energy draw specified in the energy delivery authorization data 342.

Block 1110 initiates the transition of the first computing device 120(1) from a first operating mode 506(1) to a second operating mode 506(2). At least a portion of the energy consumed by the transition may be obtained from the energy storage device 408 of the first computing device 120(1). For example, the first computing device 120(1) may initiate startup of the application hardware processor 412 using at least a portion of the stored energy 804. The startup may include operations such as providing energy to the application hardware processor 412, executing a boot loader using the application hardware processor 412, executing the OS module 426 using the application hardware processor 412, and so forth. In implementations where the computing device 120 includes one or more sensors 122, the startup operating mode 506 may also include activating one or more sensors 122. The activation may include providing energy to the one or more sensors 122, initializing the one or more sensors 122, establishing communication with the one or more sensors 122, and so forth.

Block 1112 sends energy delivery authorization data 342(2) to a second computing device 120(2) on a second network 202(2) using a second communication interface 416. For example, the second computing device 120(2) may be downstream of the first computing device 120(1).

Block 1114 configures the power supply 402 of the first computing device 120(1) to pass at least a portion of the energy from the first network 202(1) to the second network 202(2). For example, the distribution control device 410 may activate one or more FETs such that at least some of the energy obtained from the upstream device, such as the EDDD 704, is transferred to the second communication interface 416(2) for delivery to the downstream second computing device 120(2)

Figure 12:
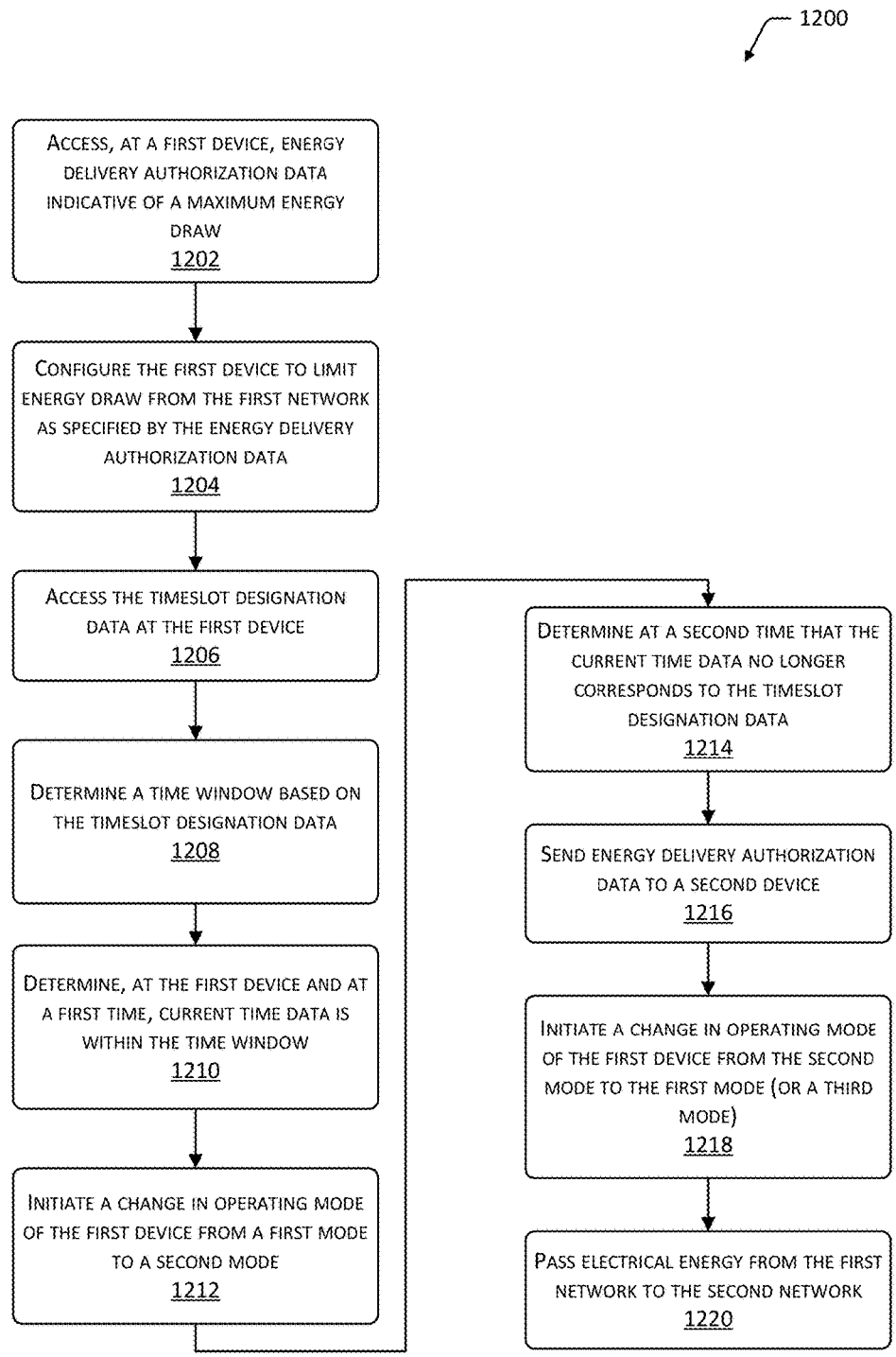
FIG. 12 depicts a flow diagram of a process of controlling energy delivery to a limit and later rescinding that limit, according to some implementations.

FIG. 12 depicts a flow diagram 1200 of a process of controlling energy delivery to a limit and later rescinding that limit, according to some implementations. The process may be performed at least in part by the network energy management module 326, the local energy management module 432, another module, or combination thereof.

Block 1202 accesses, at a first computing device 120(1), energy delivery authorization data 342(1). The energy delivery authorization data 342(1) may be indicative of a maximum energy draw to be obtained, such as from a first network 202(1). The energy delivery authorization data 342(1) may be received from the server 204, from another computing device 120, or may be generated by the computing device 120.

Block 1204 configures the first computing device 120(1) to limit energy draw from a first network 202(1) as specified by the energy delivery authorization data 342(1). For example, the first computing device 120(1) may modify the operation of one or more components to provide the limited energy draw. In another implementation, the EDDD 704 may be configured to provide limited energy to the downstream first computing device 120(1).

Block 1206, at a first computing device 120(1), accesses timeslot designation data 344. The timeslot designation data 344 is indicative of a periodically recurring interval of time. The timeslot designation data 344 may be received from the server 204, from another computing device 120, or may be generated by the computing device 120. For example, the local energy management module 432 or another module may generate the timeslot designation data 344 based at least in part on one or more of the following: a network address associated with the first communication interface 416(1), a media access control value associated with the first communication interface 416(1), a serial number associated with the at least one processor, a value generated by one or more of a random number generator or a pseudo-random number generator, and so forth. Continuing the example, the last four digits of the MAC address may be used as input to an algorithm to designate the timeslot for the computing device 120.

In another example, the timeslot designation data 344 may be determined using a timeslot reference table. The timeslot reference table may comprise an array, linked list, or other data structure that associates a particular digit with a particular periodically recurring interval of time. For example, the timeslot reference table may include:
Digit Timeslot
0.000 to 0.100 of each second
0.101 to 0.200 of each second
0.201 to 0.300 of each second
0.301 to 0.400 of each second
(continued)
Example Timeslot Reference Table A value may be determined, such as from the network address, serial number, MAC address, random number generator or pseudo-random number generator, and so forth as described above. For example, a random value using one or more of a random number generator or a pseudo-random number generator (PRNG) may be generated. One of the digits of this value may be used to select a timeslot from the timeslot reference table. For example, a first digit of the random value may be determined. Using the timeslot reference table, the particular interval of time associated with the first digit may be retrieved. The particular interval of time associated with the first digit may then be stored as the timeslot designation data 344. For example, the PRNG may generate the number 2960720. The first digit is "2" and so the timeslot is the interval of time extending from 0.201 to 0.300 of each second.

Block 1208 determines a time window based on the timeslot designation data 344. For example, the timeslot designation data 344 may indicate a timeslot having an interval of time that extends from 0.000 to 0.100 of each second, or an interval of time that extends for the first 10 seconds of each minute, and so forth.

Block 1210 determines at the first computing device 120(1) and at a first time that current time data is within the time window specified by the timeslot designation data 344. For example, the current time data may be generated by one or more of the clocks 414 onboard the computing device 120, such as a clock of the energy management processor 404. Continuing the example, if the clock indicates a current time is 12:13:11.030, it is within the window extending from 0.000 to 0.100 of each second.

Block 1212 initiates a first change in an operating mode 506 of the first computing device 120(1) from a first operating mode 506(1) to a second operating mode 506(2). In some implementations, the second operating mode 506(2) may consume more electrical energy than the first operating mode 506(1). For example, the first operating mode 506(1) may comprise one or more of an off or standby mode of one or more of the energy management processor 404, application hardware processors 412, and so forth. Continuing the example, the second operating mode 506(2) may comprise a startup operating mode. The startup operating mode may comprise the application hardware processor 412 executing a boot loader, and then executing an operating system. In another example, the second operating mode 506(2) may comprise a charging mode to charge the energy storage device 408, such as from energy obtained from the first network 202(1). In some implementations, the energy draw from the first network 202(1) may be limited to the maximum energy draw specified in the energy delivery authorization data 342.

Block 1214 determines at a second time that the current time data no longer corresponds to the timeslot designation data 344. For example, time has moved on and the timeslot has expired. The block may then initiate a second change in the operating mode 506 of the first computing device 120(1) from the second operating mode 506(2) to the first operating mode 506 (1) or to a third operating mode 506(3). For example, the operating mode 506 may transition to a standby or sleep mode.

Block 1216 sends energy delivery authorization data 342(2) to a second computing device 120(2) on a second network 202(2) using the second communication interface 416(2). For example, the first computing device 120(1) may send the energy delivery authorization data 342 to the second computing device 120(2) that is downstream and connected to the second network 202(2).

Block 1218, at the first computing device 120(1), initiates a second change in an operating mode 506 of the first computing device 120(1) from the second operating mode 506(2) to the first operating mode 506(1) or a third operating mode 506(3). For example, the first computing device 120(1) may transition from a startup or normal mode to a standby, sleep, or off mode. In another example, the application hardware processor 412 may be transitioned to operate at a higher clock speed that consumes more energy than a prior clock speed.

Block 1220 passes at least a portion of the energy from the first network 202(1) to the second network 202(2). For example, the distribution control device 410 may be directed to route some of the energy received from the first communication interface 416(1) to the second communication interface 416(2).

Figure 13:
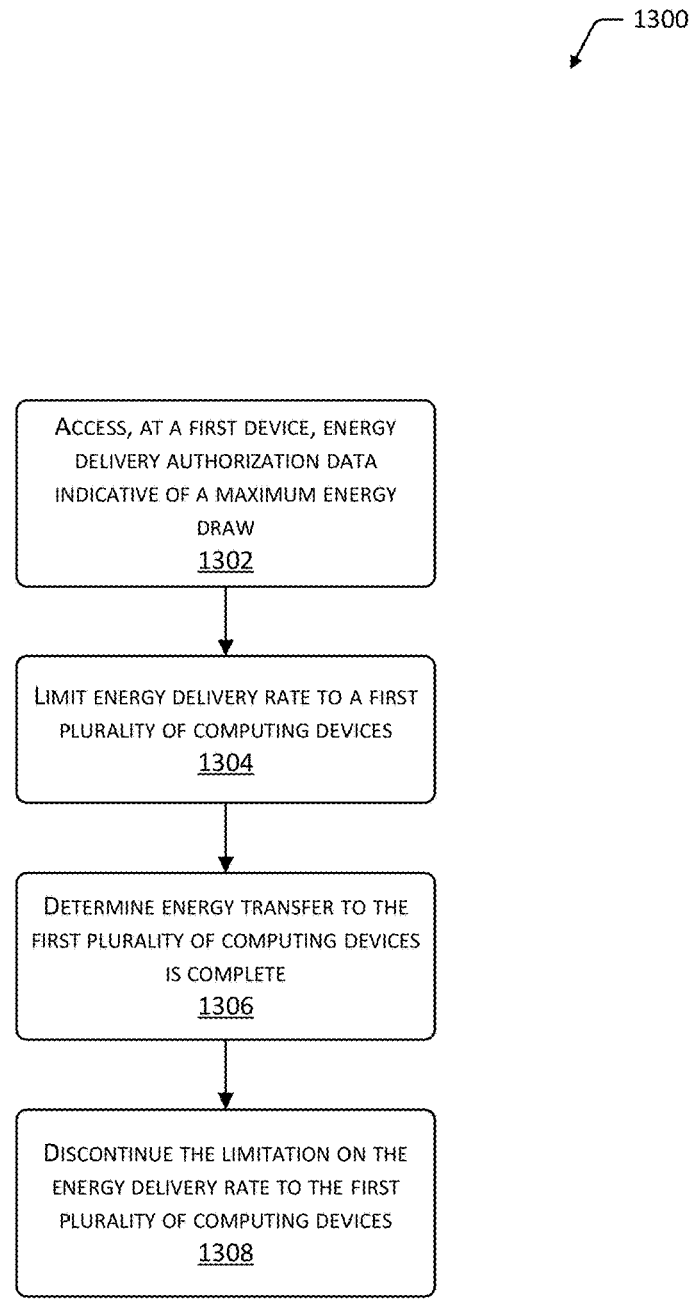
FIG. 13 depicts a flow diagram of a process of controlling energy delivery, according to some implementations.

FIG. 13 depicts a flow diagram 1300 of a process of controlling energy delivery based on timeslots, according to some implementations. The process may be performed at least in part by the network energy management module 326, the local energy management module 432, another module, or combination thereof.

Block 1302 accesses, at a first computing device 120(1), energy delivery authorization data 342(1). The energy delivery authorization data 342(1) may be indicative of a maximum energy draw to be obtained, such as from a first network 202(1). The energy delivery authorization data 342(1) may be received from the server 204, from another computing device 120, or may be generated by the computing device 120.

Block 1304 limits an energy delivery rate 802 to a first plurality of computing devices 120 connected to the network 202. The limitation of the energy delivery rate 802 may be accomplished in one of several ways. In one implementation, energy delivery authorization data 342 indicative of the limit may be provided to the first plurality of computing devices 120 using the network 202. In another implementation, the energy delivery authorization data 342 indicative of the limit may be sent to the EDDD 704 that is coupled to the network 202 and upstream of the first plurality of computing devices 120.

As described above, the EDDD 704 may include an energy supply configured to couple to main energy 702, a packet network bridge configured to transfer data between two or more ports, a distribution control device configured to transfer energy from the main energy 702 to one or more of the two or more ports, and a processor. The EDDD 704 may receive energy delivery authorization data 342 indicative of the limit of energy delivery rate 802. Responsive to the energy delivery authorization data 342, the EDDD 704 may restrict energy transferred to the two or more ports. For example, current, voltage, or other limiting may be applied to the two or more ports.

In some implementations, the energy delivery authorization data 342 may specify the maximum energy draw based on management data 132 such as energy availability data 336, energy use data 338, and so forth. For example, energy availability to the network 202 may be determined using the energy availability data 336. The limit to the energy delivery rate 802 may be determined based at least in part on the energy availability and a count of the first plurality of computing devices 120. For example, if 150 W of energy are available and there are 15 computing devices 120, the limit the energy delivery rate 802 may be set to is 10 W. Other factors such as the maximum energy transfer rate supported by the cabling or other equipment may override these determined limited rates. For example, if the cable is rated to pass no more than 8 W, the energy delivery rate may be limited to 8 W.

Block 1306 determines energy transfer to the first plurality of computing devices 120 is complete. In one implementation, energy use data 338 may be received from at least a portion of the first plurality of computing devices 120. As described above, the energy use data 338 is indicative of an energy storage device 408 local to the computing device 120 being charged to a predetermined energy level. The determination that the energy transfer is complete may thus be based at least in part on the energy use data 338.

In another implementation, the energy use data 338 may be indicative of a charging time associated with one or more of the computing devices 120 in the first plurality to reach a predetermined charge when charged at the limited energy delivery rate. For example, the energy use data 338 may indicate that a charging time of 2000 ms results in a full charge of the energy storage device 408. The determination that the energy transfer is complete is based at least in part on the energy use data 338 and a duration of time energy was delivered by the network 202 to the first plurality of computing devices 120. For example, if each timeslot was 100 ms with each timeslot occurring once per second, when the total of timeslots provided to the first plurality of computing devices 120 equals at least 2000 ms (such as after 20 seconds), the energy transfer may be determined to be complete.

Block 1308 rescinds the limitation on the energy delivery rate 802 previously imposed on the first plurality of computing devices 120. For example, the limitation managed by the local energy management module 432 may be discontinued, the EDDD 704 may remove current limiting, and so forth. As a result, the computing device 120 may obtain energy without restriction.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A first device comprising:
   a clock to generate time data;
   a first communication interface to couple to a first network to receive data and electrical energy from the first network;
   a second communication interface to couple to a second network;
   a distribution control device to control flow of the electrical energy between the first communication interface and the second communication interface;
   at least one memory, storing computer-executable instructions; and
   at least one processor to execute the computer-executable instructions to:
      access timeslot designation data indicative of a periodically recurring interval of time;
      determining a time window based on the periodically recurring interval of time;
      at a first time, determine that a current time indicated by the time data from the clock is within the time window; and
      initiate a first change in an operating mode of the first device from a first operating mode to a second operating mode, wherein the first operating mode consumes a different amount of energy than the second operating mode.

2. The first device of claim 1, further comprising an application hardware processor and further comprising one or more computer-executable instructions to, during the second operating mode:
   transition the application hardware processor to operate at a higher clock speed that consumes more energy than a prior clock speed.

3. The first device of claim 1, further comprising computer-executable instructions to:
   access a timeslot reference table associating a particular digit with a particular periodically recurring interval of time;
   generate a random value using one or more of a random number generator or a pseudo-random number generator;
   determine a first digit of the random value;
   lookup, using the timeslot reference table, the particular periodically recurring interval of time associated with the first digit; and
   store the particular periodically recurring interval of time associated with the first digit as the timeslot designation data.

4. The first device of claim 1, further comprising computer-executable instructions to:
   generate the timeslot designation data based at least in part on one or more of:
      a network address associated with the first communication interface,
      a media access control value associated with the first communication interface,
      a serial number associated with the at least one processor, or
      a value generated by one or more of a random number generator or a pseudo-random number generator.

5. The first device of claim 1, further comprising computer-executable instructions to:
   at a second time later than the first time, determine that the current time is longer within the time window; and
   initiate a second change in the operating mode of the first device from the second operating mode to the first operating mode.

6. The first device of claim 1, further comprising:
   an energy storage device to store the electrical energy received from the first network and provide the electrical energy that is stored to the first device; and
   wherein the first operating mode comprises one or more of an off or standby mode of one or more of the at least one processor; and
   further wherein the second operating mode comprises a charging mode to charge the energy storage device.

7. The first device of claim 1, wherein the at least one processor comprises:
   an energy management processor with the clock integrated therein; and
   an application hardware processor; and
   further comprising one or more computer-executable instructions to, during the second operating mode:
      execute a boot loader using the application hardware processor; and
      execute an operating system using the application hardware processor.

8. The first device of claim 1, further comprising computer-executable instructions to:
   access energy delivery authorization data indicative of a maximum energy draw to be obtained from the first network;
   limit energy draw from the first network to the maximum energy draw specified in the energy delivery authorization data; and
   draw power, as limited, from the first network to provide energy to one or more of:
      an application hardware processor,
      one or more sensors, or
      an energy storage device.

9. The first device of claim 1, further comprising computer-executable instructions to:
   send energy delivery authorization data to a second device on the second network using the second communication interface, wherein the energy delivery authorization data authorizes the second computing device to draw energy using second timeslot designation data indicative of a different interval of time for the second device;
   at a second time, determine that the current time is no longer within the time window; and
   direct the distribution control device to pass at least a portion of the energy from the first network to the second network during the second time.

10. A first computing device comprising:
   a real-time clock to generate current time data;
   a first communication interface to couple to a first network;
   a power supply to receive electrical energy from the first network and provide the electrical energy to the first computing device;
   a second communication interface to couple to a second network;
   a distribution control device to control flow of the electrical energy between the first communication interface and the second communication interface;
   at least one memory, storing computer-executable instructions; and
   at least one processor to execute the computer-executable instructions to:
      access timeslot designation data indicative of a scheduled periodically recurring interval of time;
      determine the current time data is within the scheduled periodically recurring interval of time specified by the timeslot designation data;
      during the scheduled periodically recurring interval of time, initiate a change in mode of the first computing device from a first mode to a second mode; and
      during the scheduled periodically recurring interval of time, direct the distribution control device to pass at least a portion of the electrical energy from the first network to the second network using the second communication interface.

11. The first computing device of claim 10, the power supply further comprising one or more of a battery or capacitor to store at least a portion of the electrical energy received from the first network; and
   wherein the first mode of the first computing device comprises an off or standby mode that does not charge the one or more of the battery or capacitor; and
   further wherein the second mode of the first computing device comprises a charging mode that charges the one or more of the battery or capacitor to a predetermined level of stored electrical energy, using the electrical energy received from the first network.

12. The first computing device of claim 11, further comprising computer-executable instructions to:
send energy delivery authorization data to a second computing device on the second network using the second communication interface, wherein the energy delivery authorization data authorizes the second computing device to draw energy during the scheduled periodically recurring interval of time.

13. The first computing device of claim 11, further comprising current limiting circuitry with second computer-executable instructions to:
receive the timeslot designation data;
receive energy delivery authorization data indicative of a maximum energy draw the first computing device is authorized to obtain from the first network; and
limit energy draw during the charging mode to the maximum energy draw specified in the energy delivery authorization data.

14. A method comprising:
accessing first timeslot designation data indicative of a periodically recurring interval of time for a first device configured to receive electrical energy from a first network;
determining a time window based on the periodically recurring interval of time;
determining that a current time indicated by time data of a clock of the first device is within the time window;
initiating a change in mode of the first device from a first mode to a second mode; and
directing a distribution control device to pass at least a portion of the electrical energy from the first network to a second network during the periodically recurring interval of time or at a different interval of time.

15. The method of claim 14, wherein:
the first mode of the first device comprises the first device operating at a first clock speed; and
the second mode of the first device comprises the first device operating at a second clock speed that is higher than the first clock speed.

16. The method of claim 15, further comprising:
accessing energy delivery authorization data indicative of a maximum energy draw to be obtained from the first network;
limiting energy draw of the first network to the maximum energy draw specified in the energy delivery authorization data; and
drawing power, as limited, from the first network to provide energy to one or more of:
an application hardware processor,
one or more sensors, or
an energy storage device.

17. The method of claim 15, further comprising:
sending energy delivery authorization data to a second device on the second network, wherein the energy delivery authorization data authorizes the second device to draw energy using second timeslot designation data indicative of the different interval of time for the second device;
determining that the current time is no longer within the time window; and
wherein the directing the distribution control device to pass the at least a portion of the electrical energy from the first network to the second network occurs at the different interval of time.

18. The method of claim 14, wherein:
wherein the first mode of the first device comprises an off or standby mode that does not charge an energy storage device; and
wherein the second mode of the first device comprises a charging mode that charges the energy storage device using the electrical energy received from the first network.

19. The method of claim 18, further comprising:
sending energy delivery authorization data to a second device on the second network, wherein the energy delivery authorization data authorizes the second device to draw energy during the periodically recurring interval of time; and
wherein the directing the distribution control device to pass the at least a portion of the electrical energy from the first network to the second network occurs during the periodically recurring interval of time.

20. The method of claim 18, further comprising:
receiving the first timeslot designation data;
receiving energy delivery authorization data indicative of a maximum energy draw the first device is authorized to obtain from the first network; and
limiting energy draw during the second mode to the maximum energy draw specified in the energy delivery authorization data using current limiting circuitry.

* * * * *

UNITED STATES PATENT AND TRADEMARK OFFICE
CERTIFICATE OF CORRECTION

PATENT NO. : 10,320,576 B1
APPLICATION NO. : 14/673649
DATED : June 11, 2019
INVENTOR(S) : Butler et al.

Page 1 of 1

It is certified that error appears in the above-identified patent and that said Letters Patent is hereby corrected as shown below:

In the Claims

Column 46, Lines 20-26:
Reads:
"wherein the first mode of the first device comprises an off
    or standby mode that does not charge an energy storage
    device; and
wherein the second mode of the first device comprises a
    charging mode that charges the energy storage device
    using the electrical energy received from the first
    network."

When it should read:
"the first mode of the first device comprises an off
    or standby mode that does not charge an energy storage
    device; and
the second mode of the first device comprises a
    charging mode that charges the energy storage device
    using the electrical energy received from the first
    network."

Signed and Sealed this
Sixth Day of August, 2019

Andrei Iancu
*Director of the United States Patent and Trademark Office*